(12) United States Patent
Kuwajima et al.

(10) Patent No.: US 7,110,221 B2
(45) Date of Patent: Sep. 19, 2006

(54) DISK DRIVE

(75) Inventors: Hideki Kuwajima, Kyoto (JP); Hiromi Kita, Nara (JP); Shigeo Obata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 303 days.

(21) Appl. No.: 10/856,943

(22) Filed: Jun. 1, 2004

(65) Prior Publication Data

US 2004/0240116 A1 Dec. 2, 2004

(30) Foreign Application Priority Data

Jun. 2, 2003 (JP) ............... 2003-156420

(51) Int. Cl.
*G11B 5/54* (2006.01)
*G11B 21/22* (2006.01)

(52) U.S. Cl. ............... 360/254.7; 360/255; 360/254.8; 360/264.8

(58) Field of Classification Search ............. 360/254.7, 360/254.8, 255, 264.8
See application file for complete search history.

(56) References Cited

U.S. PATENT DOCUMENTS

| 5,574,604 | A | * | 11/1996 | Berg et al. ............... 360/254.8 |
| 5,828,522 | A | | 10/1998 | Brown et al. |
| 6,275,356 | B1 | | 8/2001 | Boutaghou et al. |
| 6,278,584 | B1 | | 8/2001 | Zhang et al. |
| 6,292,333 | B1 | | 9/2001 | Blumentritt et al. |
| 6,307,716 | B1 | | 10/2001 | Hamaguchi et al. |
| 6,441,987 | B1 | | 8/2002 | Lee |
| 6,580,585 | B1 | * | 6/2003 | Feliss et al. ............. 360/254.8 |
| 6,674,613 | B1 | * | 1/2004 | Arikawa et al. ......... 360/254.7 |
| 2001/0026415 | A1 | | 10/2001 | Kusumoto |
| 2002/0044386 | A1 | | 4/2002 | Koyanagi et al. |
| 2003/0043509 | A1 | | 3/2003 | Gillis et al. |

FOREIGN PATENT DOCUMENTS

| EP | 0 342 625 | | 11/1989 |
| JP | 5-128754 | | 5/1993 |
| JP | 8-221915 | | 8/1996 |
| JP | 08263949 A | * | 10/1996 |
| JP | 10-302418 | | 11/1998 |
| JP | 2002260356 | | 9/2002 |
| JP | 2005327374 A | * | 11/2005 |

* cited by examiner

*Primary Examiner*—William J Klimowicz
(74) *Attorney, Agent, or Firm*—Wenderoth, Lind & Ponack, L.L.P.

(57) ABSTRACT

An actuator gripping device which prevents the actuator of the head support device from serious trouble such as damage to the surface of the recording medium due to external shocks. An actuator 7 comprises actuator sub-unit 27 having a tab 8 at one end and provided with a head 9, and a voice coil 10 mounted at the other end, a pivot pedestal 30 with a pair of abutments, and a spring plate 28 having an activating force to push the head 9 toward the recording medium 4, and that the actuator gripping device for gripping the actuator 7 comprises a ramp 14 formed with the first stepped side surface 14d and the second stepped side surface 14f having a specified angle respectively at either side of the second plane 14e on which the tab 8 is abutted at the shunt position in stop mode of the recording medium 4.

29 Claims, 13 Drawing Sheets

(a)

(b)

DISK DRIVE

FIELD OF THE INVENTION

The present invention relates to a signal conversion element oscillating arm used in a disk drive such as a magnetic disk drive, optical disk drive, and optical magnetic disk drive, having a floating type signal conversion element such as a magnetic head and optical head, and more particularly, it relates to an actuator gripping device of a signal conversion element oscillating (or swinging) arm at its shunt (parking) position for unloading in a state of non-operation, and a disk drive using the same.

BACKGROUND OF THE INVENTION

When the disk drive stops operating, the signal conversion element oscillating arm (hereinafter simply called an oscillating arm) mounted with a signal conversion element is unloaded from a data-recorded zone and moved to a specified zone (parking zone) on the recording medium or moved to a specified position near the outer periphery of the recording medium at which the signal conversion element is in non-contact with the surface of the recording medium to be held there. That is, when the disk drive is not operating, the oscillating arm is held at a specified shunt (parking) position. Further, an oscillating arm holding mechanism or gripping mechanism for holding or gripping the oscillating arm at its shunt position is employed in order to prevent fatal problems from occurring, when the disk drive is given external shocks during its stop mode, such as the oscillating arm moving to the data recorded zone of the recording medium from the shunt position, causing damage to the surface of the recording zone of the recording medium due to collision of the signal conversion element and the recording medium, or the surface of the data-recorded zone of the recording medium being damaged due to the signal conversion element sliding thereon as the operation is started with the element being in contact with the data recorded zone when moved to the data recorded zone, or other component parts of the disk drive colliding with the oscillating arm, causing damage to the component parts and the oscillating arm.

An example of a conventional disk drive having an oscillating arm holding mechanism or gripping mechanism will be described in the following.

First, as to a disk storing device having an oscillating arm holding mechanism, the configuration proposed is such that an actuator (corresponding to the oscillating arm) being a voice coil motor (hereafter called VCM) comprises an actuator arm provided with a conversion head (corresponding to the signal conversion element) at one end and a coil at the other end thereof, of which an iron piece is attached to a projection integrally disposed at the other end, and also, a permanent magnet fixed in a housing opposite to the iron piece disposed on the actuator arm, and an actuator arm holding mechanism with the iron piece arranged on the actuator arm and the permanent magnet fixed in the housing.

In such a configuration, when the disk storing device stops operating, a current is supplied to the coil of the VCM, and the actuator arm is operated to move to a specified shunt position, then the iron piece is attracted by the permanent magnet as it approaches the specified shunt position, which is thereby able to fix the actuator arm at the shunt position. And in that condition, the actuator arm will not be moved even when an external force is given thereto because it is held by magnetic attraction, and thereby, the data on the data recorded zone of the recording medium and the actuator are prevented from accidental movement of the conversion head and the actuator arm (for example, refer to Japanese Patent Publication No. JP2803693, P3 and FIG. 1).

Also, as to a disk storing device having an oscillating arm gripping mechanism, the configuration proposed is such that there is provided an actuator arm gripping mechanism, the same as in the above example of a disk storing device having an oscillating arm holding mechanism, and further, it comprises an actuator arm gripping mechanism formed of a lock means and solenoid coil, wherein the actuator arm gripping mechanism is further resilient so as to vertically engage the actuator being the VCM, and a spring plate with a vertical stress is vertically moved according to the movement of an iron plunger with a current supplied to the solenoid coil, and under the plunger is arranged a magnet as the first magnetic field feeding means having the first magnetic force, and there above is arranged a VCM yoke as the second magnetic field feeding means having the second magnetic force, and when the first current is supplied to the solenoid coil, a magnetic force to push up the plunger is generated to move the spring plate upward, and also, when the second current different from the first current is supplied, a magnetic force to push down the plunger is generated to move the spring plate downward. Also, the spring plate is fixed at the lower side by the first magnetic force of the magnet having a downward magnetic force greater than the vertical stress of the spring plate, and also, the spring plate is attracted upward and fixed at the upper side by the second magnetic force of the VCM yoke in addition to the upward stress of the spring plate.

In such a configuration, when the disk drive is operated, the plunger is attracted toward the magnet by the first magnetic force, and further, the spring plate is pressed down by the plunger, thereby securing the spring plate so as to be fixed in an unlocked state at a height so that the spring plate does not block the movement of the actuator. Also, when the disk drive is stopped, the actuator is moved to a specified position (corresponding to the shunt position), and the first current that is greater than the difference between the first magnetic force of the magnet and the stress of the spring plate and is also able to generate an upward magnetic force is supplied to the solenoid coil, thereby moving the spring plate upward, and thus the spring plate is moved to the upper side and fixed in a locked state. In this case, the current is supplied to the solenoid coil only when the state is shifted from an unlocked state to a locked state or from a locked state to an unlocked state, and when the spring plate is fixed at the lower side or upper side in an unlocked state or a locked state, the solenoid coil is not supplied with current. When the disk drive is stopped, the magnetic attraction by the iron piece and permanent magnet and the spring plate are fixed at the upper side in a locked state, locking the actuator at the shunt position, and thereby, the actuator can be secured horizontally and vertically, and it is possible to prevent the actuator from being moved by shocks (for example, Japanese Patent Laid-Open Application No. JP08-221915, P4, P5, FIG. 1, FIG. 2 and FIG. 4).

Also, as an another example of a disk storing device having an oscillating arm gripping mechanism, the configuration proposed is such that the actuator is rotatably disposed for rotation about the oscillation axis, comprising a head arm and a coil arm which are arranged opposite to each other with the oscillation axis therebetween. The disk drive thus configured is characterized as in the following.

(1) The head arm is formed of a carriage arm and a suspension arm, and the suspension arm has a tab formed with a projection for shunting to the ramp block, and a read and/or write head mounted with a signal conversion element is disposed near there.

(2) Also, the coil arm mounted with a voice coil on the inner surface is formed of an outer arm and an inner arm.

(3) The ramp block and the inertia mechanism which are disposed at the shunt position of the actuator are housed in an enclosure.

(4) The ramp block threaded to the enclosure has a plurality of ramps protruded horizontally from the side of the ramp support, and the ramp has a composite plane including a first slope, a peak plane, a second slope, a bottom plate, and a third slope.

(5) The inertia mechanism comprises an inertia lever capable of oscillating about the oscillation axis, a latch lever capable of oscillating about other oscillation axis, and a spring for holding the latch lever at the arm release position. And at the inertia moments of the inertia lever and the latch lever around the respective oscillation axes, the inertia moment of the inertia lever is greater than that of the latch lever.

(6) The inertia lever includes an inertia arm and a balance arm on which a first fitting projection for engaging the latch lever at the first fitting portion and a second fitting projection for engaging at the second fitting portion are formed.

(7) The latch lever includes a latch arm and a sub-arm on which two spring fitting projections, positioning projection, and latch projection for engaging the action side end of the spring are formed. The positioning projection serves to determine the actuator release position of the latch lever and the actuator latch position. The latch projection serves to latch the actuator by engaging the tip of the inner arm of the actuator when the latch lever moves to the actuator latch position.

(8) The actuator lock mechanism is formed of the ramp block and the inertia latch mechanism.

Regarding the configuration having these characteristics, when the disk drive is in non-operation mode, the actuator is unloaded to the shunt position, and the tab of the suspension arm is held on the bottom plane of the ramp, and when the shock is very fine, the tab projection of the suspension arm climbs the second slope or the third slope of the ramp to attenuate the oscillation energy of the head arm, thereby suppressing the movement of the head arm and preventing the head arm from moving from the shunt position to the disk side or to the side opposite thereto, which functions as an actuator holding mechanism for holding the head arm at the shunt position. Also, in the operation of the inertia latch mechanism when a shock is given to the disk drive in non-operation mode, in case the actuator is given torque to oscillate counterclockwise due to an external shock, the inertia lever and the latch lever are given torque to rotate counterclockwise about the respective oscillation axes, and when the torque acting on the inertia lever is greater than the torque due to the shock on the latch lever and the resultant torque due to the spring torque to turn the latch lever clockwise about the oscillation axis, then the inertia lever turns counterclockwise irrespective of the direction of the torque acting on the latch lever, and at the first fitting portion, the latch lever is pulled by the first fitting projection to oscillate the latch lever counterclockwise, and the latch projection of the latch arm engages the tip of the inner arm coming from the shunt position, thereby latching the actuator. After that, the tab of the actuator is pushed back to the bottom plane of the ramp by the action of the second slope of the ramp, disengaging the inner arm tip and the latch projection, and then the latch arm returns to the actuator release position by the action of the spring. Also, when the actuator is given torque to oscillate clockwise due to external shocks, the inertia lever and the latch lever are given torque to oscillate clockwise about the respective oscillation axes, and then the latch lever is always subjected to torque to turn clockwise about the oscillation axis by the action of the spring in addition to the torque due to the shocks. At the second fitting portion, in case the torque acting on the inertia lever is greater than the resultant force of the torque due to shocks given to the latch lever and the torque by the action of the spring, the latch lever is pushed by the second fitting projection at the second fitting portion, oscillating the latch lever counterclockwise, and the latch projection of the latch arm bumps against the crush stop made from a resilient material to restrict the oscillation range of the actuator, thereby engaging the tip of the inner arm rebounded counterclockwise and causing the actuator to be latched. The torque due to shocks acting upon the inertia lever is greater than the torque given to the latch lever due to shocks, and the inertia moment of the inertia lever is set greater than the inertia moment of the latch lever in order to attain the oscillation in the direction of the inertia lever's torque due to shocks, and the oscillating distance of the latch projection from the release point to the latch point, the position of the latch point, and the distance from the latch projection to the oscillation axis are set so that the latch projection moves to the latch point before the tip of the inner arm moves from the shunt point to the latch point, and thus the actuator is latched at the shunt position, then the actuator is locked, thereby preventing the head arm and the read and/or write head from getting into the space where a disk is arranged. (For example, refer to Japanese Patent Laid-Open Application No. 10-302418, P4, P5, FIG. 1, FIG. 2; No. 2002-206356, P5~6, FIG. 1).

However, in the holding mechanism of the actuator used for a disk storing device having a conventional oscillating arm holding mechanism as described above, when the disk storing device is stopped, the actuator arm is secured at the shunt position of the actuator by the attraction of the iron piece and the permanent magnet fixed in the housing which are disposed on the actuator arm. In the case of an actuator holding mechanism with such a configuration, the shock resistance is relatively high when a shock is given in the same direction as the rotating direction of the actuator, but the shock resistance is relatively low when a great shock is given for a short time or the shock given includes a vertical component as against the rotating direction of the actuator. Therefore, there arises a problem that it is unable to display sufficient holding function against shocks. Also, an iron piece and permanent magnet are necessary to hole the actuator at the shunt position, resulting in increase of the number of component parts and the cost of the device.

Also, in the case of an actuator gripping device having a conventional oscillating arm holding mechanism as described above, the actuator gripping device is configured in that the actuator is gripped at the shunt position in order to prevent the actuator at the shunt position from moving to the data recorded zone of the recording medium when a relatively great shock is given to the device. Particularly, in the example having an actuator gripping device formed of a lock means and solenoid coil, the actuator gripping device comprises an iron piece disposed on the actuator arm, a permanent magnet disposed in the housing, a spring plate for gripping the actuator, a magnet for fixing the spring plate at the lower side, a plunger for vertically moving the spring plate, and a solenoid coil for vertically moving the plunger. And when the disk drive is stopped, the actuator is moved to the shunt position, and the spring plate is moved upward along the vertical movement of the plunger, thereby locking the spring plate and locking the actuator at the shunt position. In this way, it is resistant against relatively great shocks, but when subjected to very great shocks in the same direction as the moving direction of the plunger, it is necessary to set the upward stress of the spring and the second magnetic force of the VCM yoke high enough to resist the shocks in order to maintain the locked state of the spring plate. Accordingly, for achieving the purpose of moving the plunger downward against the great resultant force of the upward stress of the spring plate and the second magnetic force of the VCM yoke and for unlocking the spring plate, it is necessary to generate a great magnetic force by applying a high level of current to the solenoid coil, and consequently, the solenoid coil has to be increased in size and there should be provided a space for arranging the component parts of the actuator gripping device to lock the actuator at the shunt position, making it difficult to reduce the size of the disk drive. Further, a large number of parts are required for setting up the actuator mechanism, resulting in increase of the cost of the device.

Also, in the disk drive comprising an actuator rotatably disposed about the oscillation axis, and a head arm and a coil arm which are arranged so as to be opposed to each other across the oscillation axis, the inertia latch mechanism is configured with an inertia lever, latch lever and spring, and when the disk drive in non-operation mode is given a relatively great shock, the inertia lever rotates, causing the latch lever to turn counterclockwise irrespective of the direction of torque acting upon the latch lever, and the latch projection of the latch arm to engage the tip of the inner arm at the coil arm of the actuator coming from the shunt position, and thereby, the actuator is latched. And to achieve the purpose, the inertia moment of the inertia lever is set greater than the inertia moment of the latch lever. In the case of an actuator gripping device based on a configuration having such an inertia latch mechanism, the blind zone against shocks can be can be reduced, improving the reliability of the actuator gripping device, but many parts are necessary for configuring the inertia latch mechanism and also a space is required for arranging such parts, resulting in increase of the cost of the device and causing hindrance to the size reduction.

The present invention is intended to solve the above problems, and the object of the invention is to provide an actuator gripping device having a very simple configuration and excellent impact resistance, and a disk drive provided with the device.

SUMMARY OF THE INVENTION

In order to achieve the purpose, the actuator gripping device of the present invention comprises a head support arm formed with a tab at one end and also with a read and/or write head mounted with a signal conversion element for recording and reproducing signals on a recording medium, an actuator sub-unit mounted with a voice coil at the other end, and an actuator having a pivot pedestal for supporting the actuator sub-unit and an elastic means for activating the read and/or write head in a direction of approaching the recording medium, and a ramp block having a ramp with a plurality of slopes and a plurality of planes on which the tab of the actuator abuts and slides and a ramp mounting portion, and a voice coil motor having upper yokes, lower yokes, and magnets fixed on the upper yokes which are respectively disposed opposite to each other at either side of the voice coil across the voice coil built in the actuator sub-unit, wherein the actuator rotates the actuator sub-unit around the rotary shaft in a radial direction of the recording medium, and also, in a direction perpendicular to the surface of the recording medium around a line perpendicular to the center line in the lengthwise direction of the actuator on a plane perpendicular to the axial center of the rotary shaft, and the ramp includes a plane corresponding to the shunt position of the actuator in stop mode of the recording medium and a first stepped side surface with a specified angle to the plane at one side of the plane, and further, an elastic means is disposed between the pedestal and the actuator sub-unit, which acts as a spring plate, and the pedestal is a pivot pedestal with a pair of abutments.

In such a configuration, since the actuator sub-unit and the spring plate being an elastic means can be independently set, it is possible to enhance the rigidity of the actuator sub-unit and to freely set the activating force to the read and/or write head by means of the elastic means, and thereby, very high shock resistance and high resonance frequency can be assured and the actuator thus configured is capable of excellent response and high-speed access. Further, at the shunt position of the actuator, even in case of great external shocks, due to the nearly vertical first stepped side surface provided at one side of the plane on which the actuator tab of the ramp is pressed and abutted by the activating force of the elastic means, the tab will not come off from the plane. Accordingly, it is possible to realize an actuator gripping device having a very simple configuration capable of preventing the read and/or write head from bumping against the surface of the recording medium, thereby preventing the signal conversion element mounted on the read and/or write head and the recording medium from being damaged.

Also, the actuator gripping device of the present invention is configured in that the actuator is able to rotate the actuator sub-unit in a direction perpendicular to the recording medium around the line connecting the connecting portions of the paired abutments of the pivot pedestal and the head support arm configuring the actuator sub-unit, and also, the voice coil motor comprises a voice coil fixed on the actuator sub-unit, and magnets and lower yokes arranged in such manner as to sandwich the top and bottom of the voice coil, and the actuator is rotated in a radial direction of the recording medium by means of the voice coil motor. Also, the configuration is such that the magnet is shaped so that the size in the radial direction of rotation of the actuator of the magnet opposing to the voice coil, at the shunt position of the actuator when the recording medium is in stop mode, is greater than the size in radial direction of rotation of the actuator of the magnet positioned opposite to the voice coil in recording/reproducing operation on the surface of the recording medium. Further, when the actuator is rotated toward the recording medium from the shunt position of the actuator when the recording medium stops rotating, suppose the activating force to push the plane corresponding to the shunt position of the actuator is $F_1$, the vertical driving force applied to the tab by the voice coil motor is $F_3$, the friction coefficient between the tab and the first stepped side surface when the tab slides on the first stepped side surface is $\mu$, and the angle of the first stepped side surface to the plane perpendicular to the plane is $\alpha$, then the relationship established is $F_4 > F_1 + \mu(F_1 \tan \alpha + F_3)$ with respect to $F_4$ that shows the vertical driving force generated by the voice coil motor acting on the tab.

Due to such configurations, it is possible to accurately determine the rotational center for rotating the actuator in a direction perpendicular to the recording medium with use of a simple configuration. As a result, the positioning control of the signal conversion element can be more accurately executed, and further, at start of the disk drive operation, a rotational force can be given to the tab of the actuator in order to move the actuator upward in a direction perpendicular to the surface of the recording medium so as to move off from the plane of the ramp that is the shunt position with stepped side surfaces at either side, thereby easily moving the tab off from the plane and moving the actuator toward the recording medium.

Also, the actuator gripping device of the present invention is configured in that a pair of abutments of the pivot pedestal are disposed in a position symmetrical to the center line in the lengthwise direction of the actuator, and also, the pivot pedestal is provided with a pair of abutments in such manner that the respective connecting portions of the paired abutments of the pivot pedestal and the actuator sub-unit pass through the axial center of the rotary shaft and abut the actuator sub-unit on a line perpendicular to the axial center.

Due to such configurations, the weight is well-balanced between the widthwise direction and the lengthwise direction of the actuator and it is possible to improve the shock resistance of the actuator.

Also, the actuator gripping device of the present invention is configured in that the actuator sub-unit is provided with a balancer with the mass and fixing position set so that the center of gravity of the actuator nearly corresponds to the axial center of the rotary shaft, and also, the position of fixing the balancer onto the actuator sub-unit is a position outside the voice coil as against the rotary shaft or the position of fixing the balancer onto the actuator sub-unit is at the read and/or write head side as against the rotary shaft.

Due to such configurations, it is possible to prevent unnecessary vibration of the actuator or the like from occurrence even in case of external shocks or the like.

Also, the actuator gripping device of the present invention is configured in that the tab of the actuator sub-unit configuring the actuator has an activating force to push the plane corresponding to the shunt position of the actuator when the recording medium stops rotating.

Due to the configuration, it is possible to keep the actuator at the shunt position because of the force given to restore the tab of the actuator to the plane that is the shunt position of the ramp even in case of external shocks when the actuator is at the shunt position.

Also, the actuator gripping device of the present invention is configured in that the actuator sub-unit has a dimple that abuts a portion near the center of the read and/or write head.

Due to the configuration, unnecessary inclination of the read and/or write head in directions of roll and pitch in recording/reproducing operation of the disk drive is absorbed by a gimbal mechanism, and it is possible to obtain an effect for realizing stable recording and reproducing operation.

Also, the actuator gripping device of the present invention is configured in that the ramp is disposed near the outer periphery of the recording medium, and a magnet is disposed opposite to the recording medium as against the actuator provided with a voice coil, or the ramp is disposed near the rotational center of the recording medium, and a magnet is disposed at the recording medium side as against the actuator provided with a voice coil.

Due to such configurations, a repulsion-drive torque is generated in a direction reverse to the direction of a rotational torque to the actuator, generated by the VCM, and the magnet, and thereby it is possible to move the actuator nearly upward along the first stepped side surface from the shunt position, and further, to move the actuator toward the recording medium.

Also, the actuator gripping device of the present invention is configured in that the actuator is rotated in a direction radial to the recording medium by means of a voice coil motor.

Due to the configuration, it is possible to speed up the rotation of the actuator and to provide the actuator with a characteristic of excellent response.

Also, the actuator gripping device of the present invention is configured in that the ramp block includes a cover portion opposed to the surface on which the tab slides.

Due to the configuration, it is possible to prevent the actuator or other members from being damaged as the tab of the actuator moves off from the ramp even in case the actuator is rotated in a direction perpendicular to the recording medium due to great external forces given thereto for some reasons such as dropping when the actuator is at the shunt position.

Also, the actuator gripping device of the present invention is configured in that the friction coefficient between the tab and the first stepped side surface when the tab slides on the first stepped side surface is $\mu$, then the specified angle $\theta$ of the first stepped side surface to the plane of the ramp is set so that $90 \leq \theta \leq 90 + \tan^{-1} \mu$ with respect to the plane corresponding to the shunt position of the actuator in stop mode of the recording medium, and further, the specified angle $\theta$ of the ramp to the first stepped side surface is set so that $90° \leq \theta \leq 100°$ with respect to the plane corresponding to the shunt position of the actuator in stop mode of the recording medium.

Due to such configurations, at the shunt position of the actuator, even in case of great external shocks, due to the nearly vertical first stepped side surface provided at one side of the plane on which the actuator tab of the ramp is pressed and abutted by the activating force of the elastic means, the tab of the actuator of the ramp will not come off from the plane. Accordingly, it is possible to realize an actuator gripping device having a very simple configuration capable of preventing the read and/or write head from bumping against the surface of the recording medium, thereby preventing the signal conversion element mounted on the read and/or write head and the recording medium from being damaged.

Also, in order to achieve the purpose, the disk drive of the present invention includes a support for a recording medium, the support being rotatable around a medium axis, a head support arm (21) including a read and/or write head (9) mounted at one end of the head support arm, the head support arm being connected to a pivot pedestal (30), which is pivotable about a pivot pedestal axis being parallel to the medium axis, but distant thereto, abutment (30a, 30b) being provided between the pivot pedestal (30) and the head support arm (21), the connecting portion ($P_1$, $P_2$) between the abutment (30a, 30b) and the head support arm (21) or the abutment (30a, 30b) and the pivot pedestal (30) defining a head arm pivot axis, being perpendicular to the plane suspended by the longitudinal axis of the head support arm (21) and the pivot pedestal axis, the head support arm (21) being connected to the pivot pedestal (30) by a spring plate (28) for biasing the support arm, the head support arm (21) being pivotable about the head arm pivot axis, characterized in that, forces in a radial direction of the head support arm and in a direction perpendicular to the radial direction are given to the head support arm for moving the head support arm from a shunt position to a read and/or write position on the recording medium, and the head support arm (21) includes a tab (8) mounted at one end of the head support arm, and a ramp (14) is disposed for retaining the tab when the head support arm is at a shunt position, a first stepped side surface for preventing the tab from moving from the shunt position toward the recording medium and a maintaining plane for the tab to maintain the shunt position are formed at the ramp, and further, the specified angle at the second stepped side surface of the ramp is set so as to be nearly perpendicular to the plane corresponding to the shunt position of the head support arm in stop mode of the recording medium.

Due to such configurations, at the shunt position of the head support arm, even in case of great external shocks, due to the nearly vertical second stepped side surface provided at the other side of the plane on which the head support arm tab of the ramp is pressed and abutted by the activating force of the elastic means, the tab of the head support arm of the ramp will not come off from the plane. Accordingly, it is possible to realize an head support arm gripping device having a very simple configuration capable of preventing the head support arm from bumping against the components parts of the disk drive which are disposed around the ramp block, thereby preventing the component parts of the head support arm and the component parts of the disk drive from being damaged.

Also, the disk drive of the present invention is configured in that besides an elastic means is disposed between the pivot pedestal and the head support arm, the elastic means is a spring plate, and also, the pedestal is a pivot pedestal having a pair of abutments, and in stop mode of the recording medium, the tab of the head support arm has an activating force to push the maintaining plane corresponding to the shunt position of the head support arm, and also, the ramp is disposed near the outer periphery of the recording medium, a magnet is disposed opposite to the recording medium as against the head support arm provided with a voice coil, and also, the ramp is arranged near the rotational center of the recording medium, a magnet is disposed at the recording medium side as against the head support arm provided with a voice coil, and on the ramp portion is provided a cover portion opposed to the surface on which the tab slides, and also, the friction coefficient between the tab and the first stepped side surface when the tab slides on the first stepped side surface is $\mu$, then the specified angle $\theta$ of the first stepped side surface to the plane of the ramp is set so that $90 \leq \theta \leq 90 + \tan^{-1} \mu$ with respect to the maintaining plane corresponding to the shunt position of the head support arm in stop mode of the recording medium, and also, the specified angle $\theta$ of the ramp to the first stepped side surface is set so that $90° \leq \theta \leq 100°$ with respect to the maintaining plane corresponding to the shunt position of the head support arm in stop mode of the recording medium, and also, at the other side of the maintaining plane corresponding to the shunt position of the head support arm is formed the second stepped side surface having a specified angle to the first stepped side surface, and also, the specified angle at the second stepped side surface of the ramp is set so as to be nearly perpendicular to the maintaining plane corresponding to the shunt position of the head support arm in stop mode of the recording medium, and also, the size in a radial direction of head support arm rotation of the magnet opposing to the voice coil when the head support arm is at the shunt position in stop mode of the recording medium is greater than the size in a radial direction of head support arm rotation of the magnet opposing to the voice coil when recording/reproducing on the surface of the recording medium, and also, when the head support arm is turned to the recording medium side from the shunt position of the head support arm in stop mode of the recording medium, the activating force to push the maintaining plane corresponding to the shunt position of the head support arm is $F_1$, the vertical driving force given to the tab by the voice coil motor is $F_3$, the friction coefficient between the tab and the first stepped side surface when the tab slides on the first stepped surface is $\mu$, and the angle of the first stepped side surface to the plane perpendicular to the plane is $\alpha$, then $F_4$ showing the vertical driving force generated by the voice coil motor and applied to the tab is set so that the relationship established is $F_4 > F_1 + \mu(F_1 \tan \alpha + F_3)$.

Due to such configuration, in stop mode of the disk drive, the head support arm can be gripped by using a very simple configuration, and the head support arm does not move off from the shunt position even in case of great external shocks. Accordingly, it is possible to realize a disk drive capable of preventing the read and/or write head from bumping against the surface of the recording medium in order to prevent the signal conversion element mounted on the read and/or write head and the recording medium from being damaged, thereby assuring very high shock resistance, excellent response characteristic, and reliable high-speed access.

BRIEF DESCRIPTION OF THE DRAWINGS

FIG. 9 (*b*) is a graph showing the relationship between the rotational angle position of the actuator and the repulsion-drive torque by the VCM in the preferred embodiment of the present invention.

DETAILED DESCRIPTION OF THE INVENTION

The preferred embodiment of the present invention will be described in the following with reference to the drawings.

PREFERRED EMBODIMENT

Figure 1:
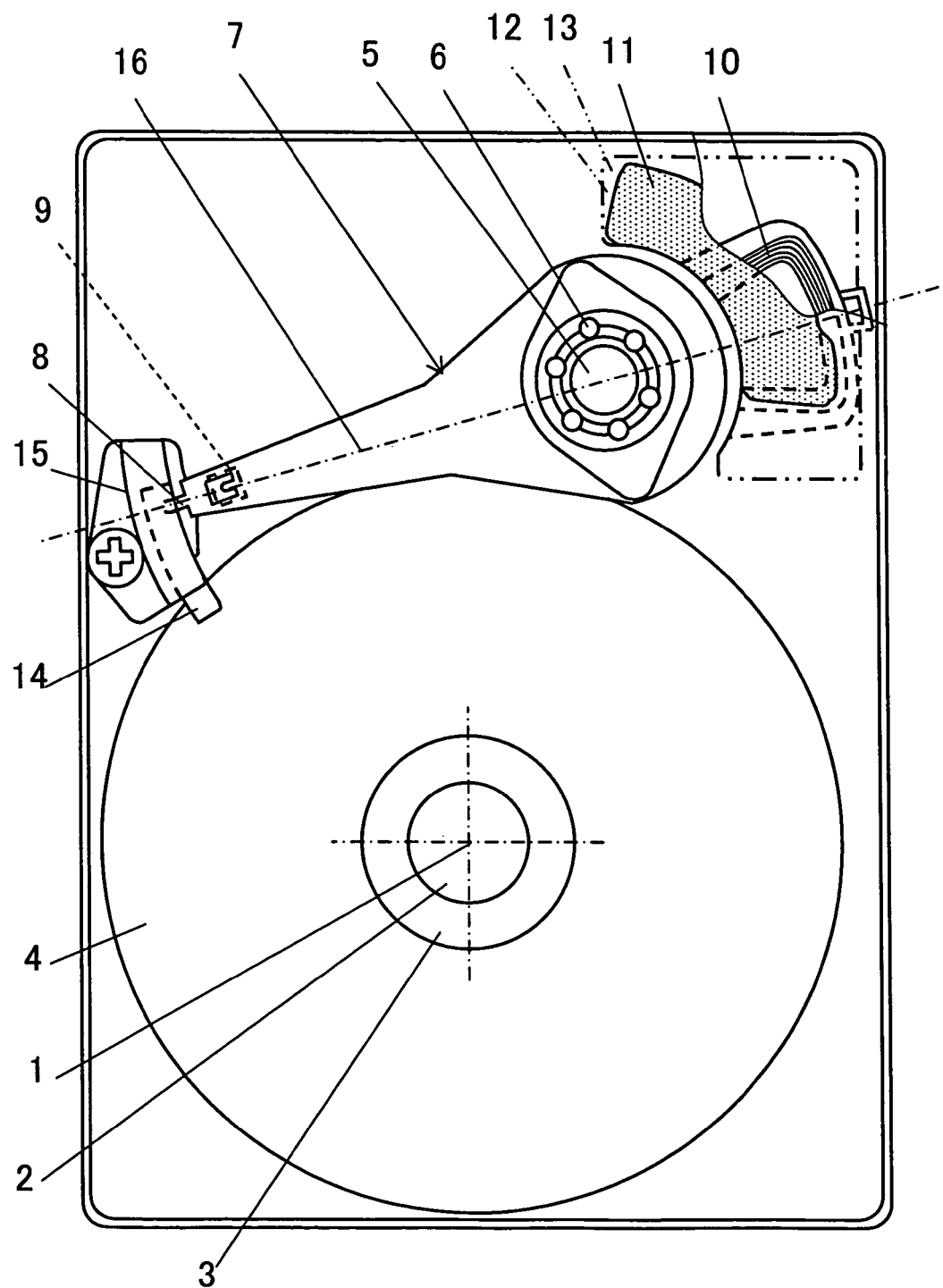
FIG. 1 is a plan view showing the configuration of an essential portion of the disk drive with the actuator at the shunt position in the preferred embodiment of the present invention.
Figure 2:
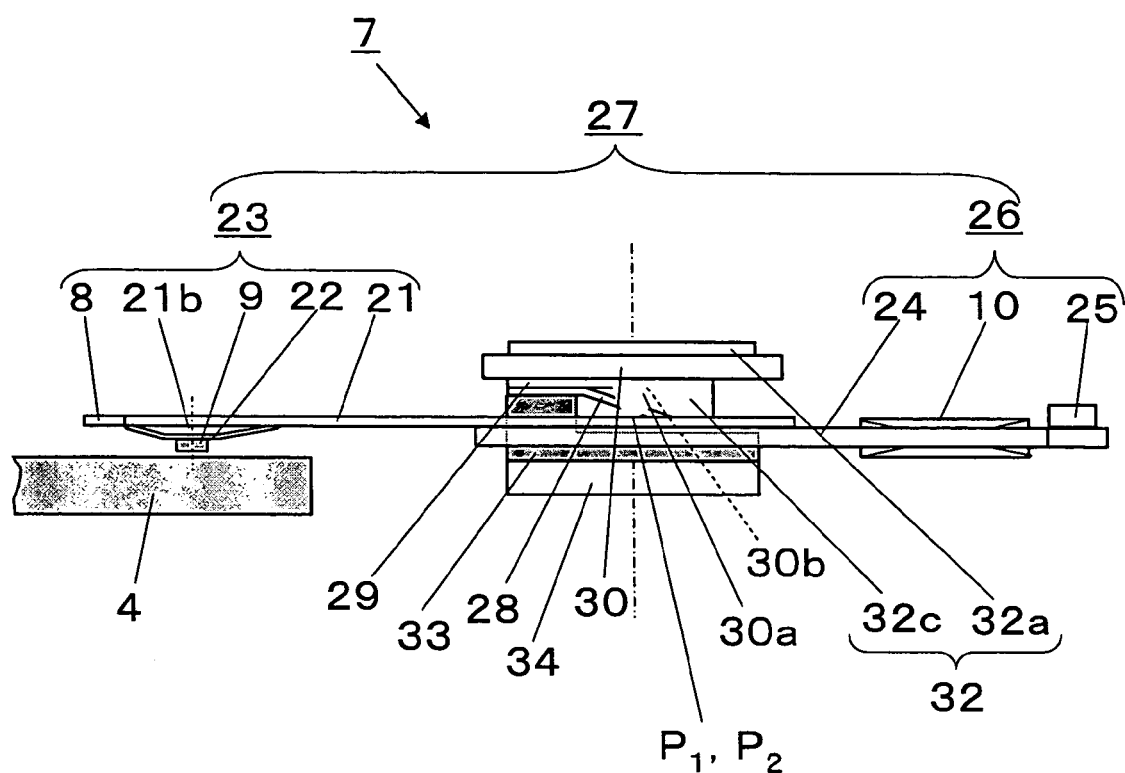
FIG. 2 is a schematic side view showing the configuration of the actuator of the disk drive in the preferred embodiment of the present invention.
Figure 3:
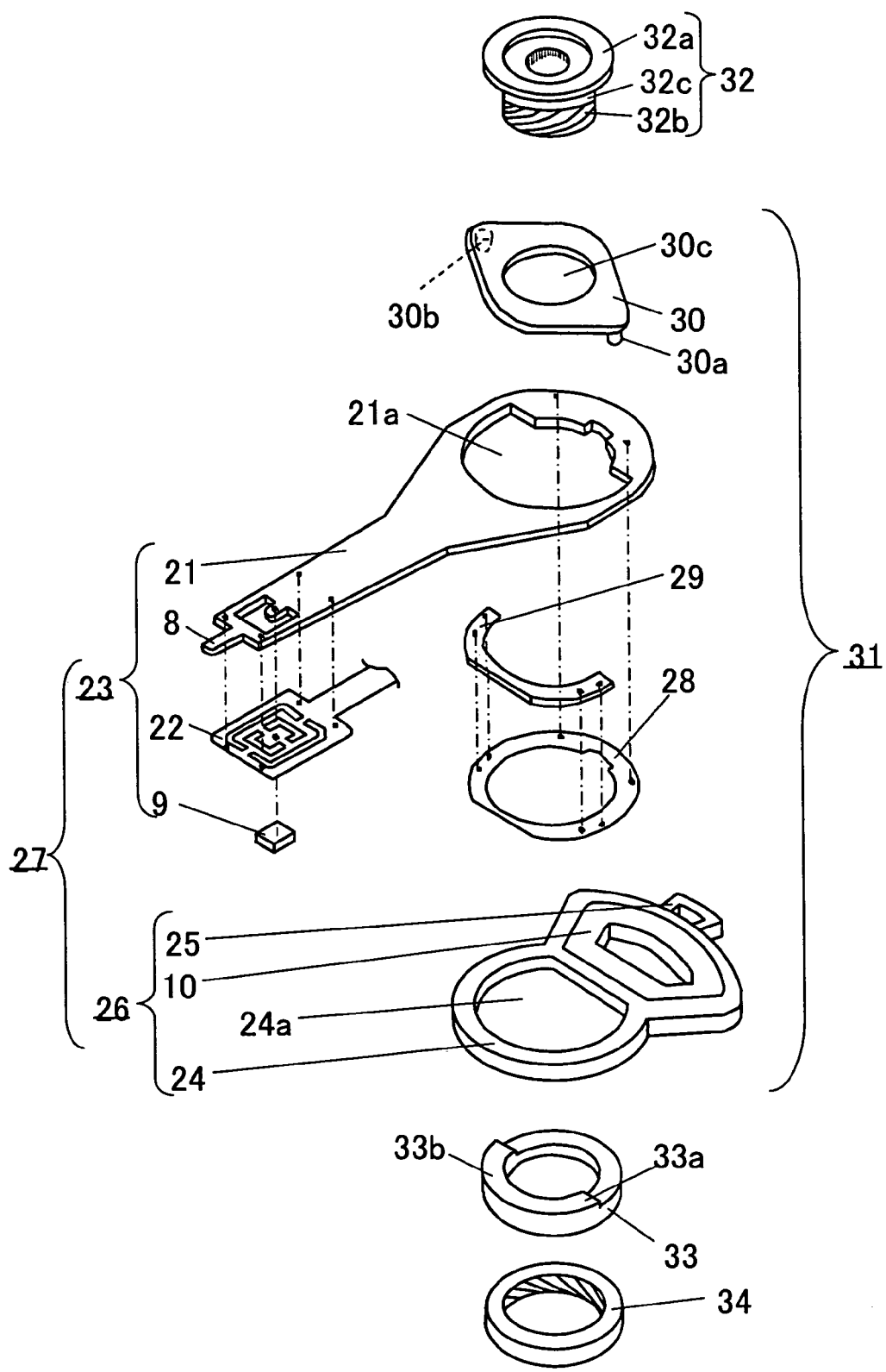
FIG. 3 is an exploded perspective view showing the configuration of the actuator of the disk drive in the preferred embodiment of the present invention.
Figure 4:
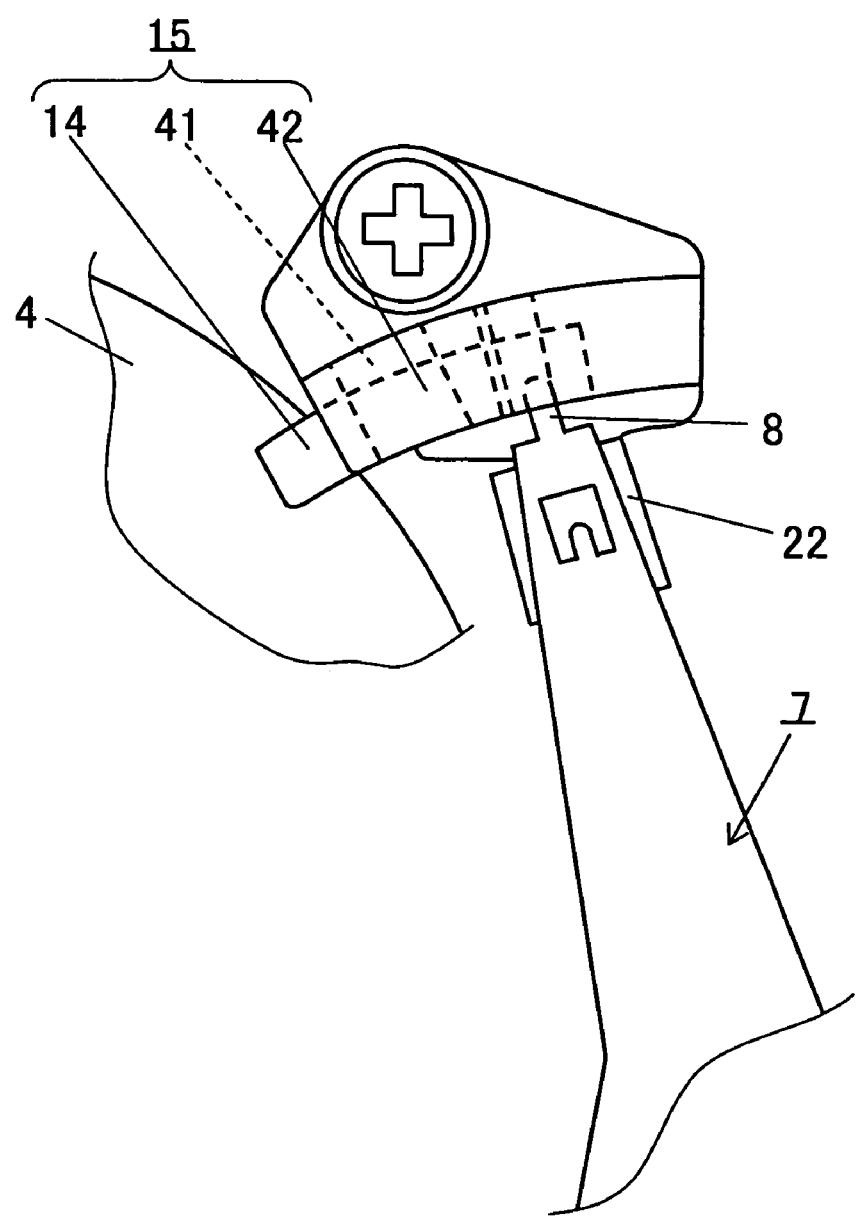
FIG. 4 is a partly enlarged plan view showing the vicinity of the ramp block of the disk drive with the actuator at the shunt position in the preferred embodiment of the present invention.
Figure 5:
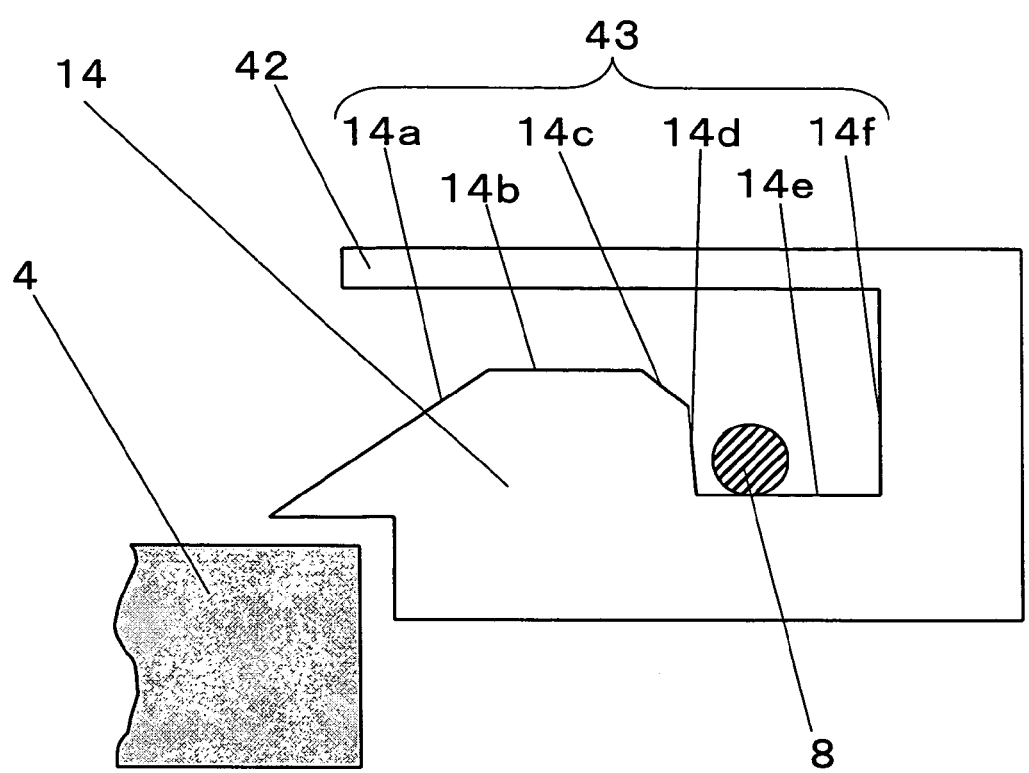
FIG. 5 is a partly enlarged sectional view showing the ramp, tab and recording medium cut along the cover portion of the ramp block of the disk drive in the preferred embodiment of the present invention.
Figure 6:
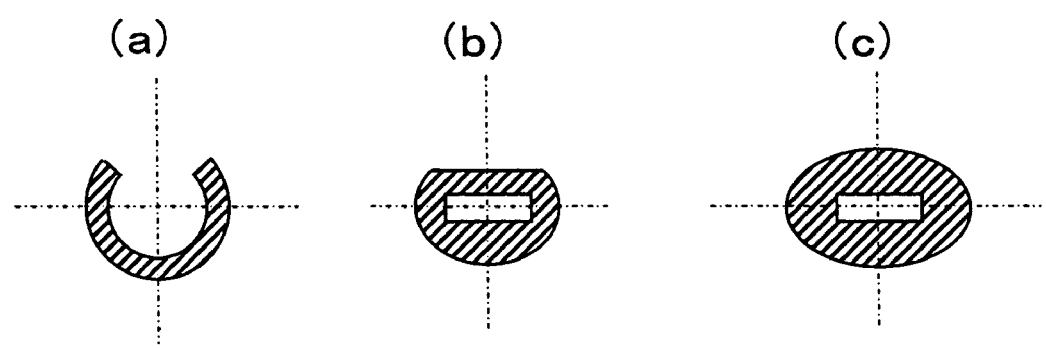
FIG. 6 (*a*) to (*c*) are enlarged sectional views showing the shape of the tab of the driving disk in the preferred embodiment of the present invention.
Figure 7:
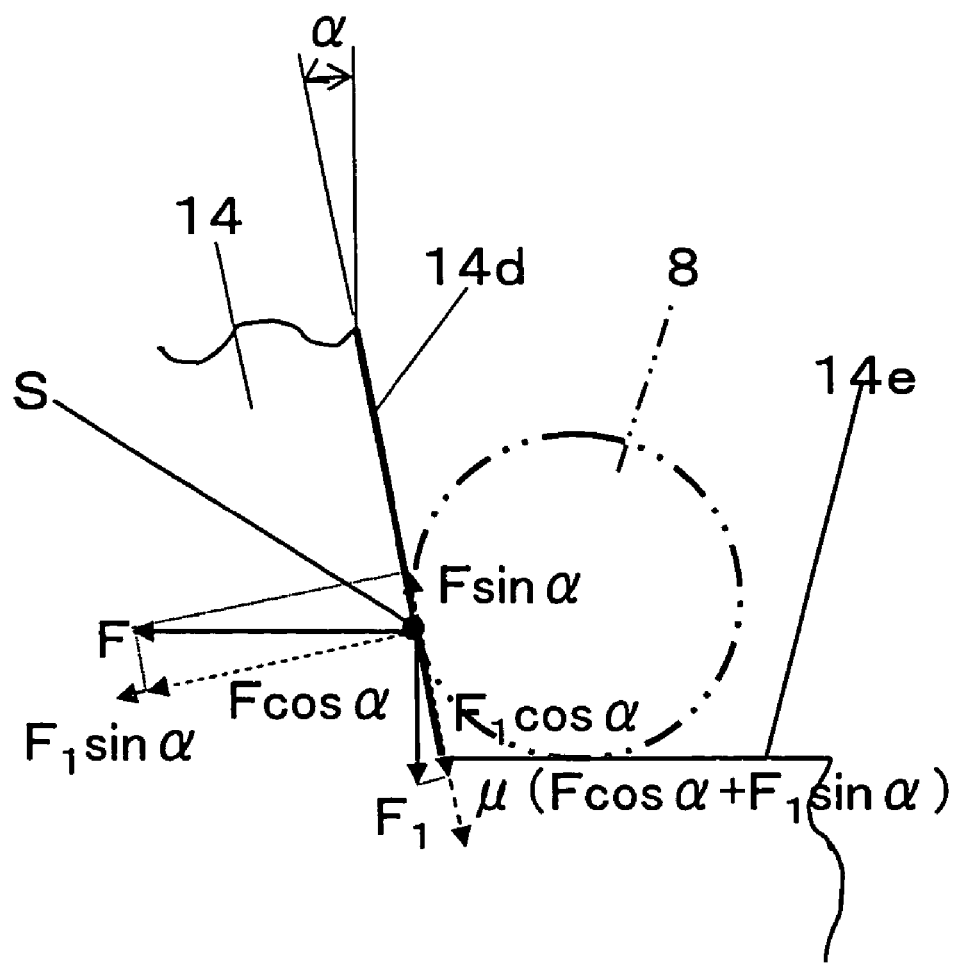
FIG. 7 is an explanatory diagram showing the pressure applied by the tab to the stepped side surface of the ramp in case of a shock given to rotate the actuator at the disk drive in the preferred embodiment of the present invention.
Figure 8:
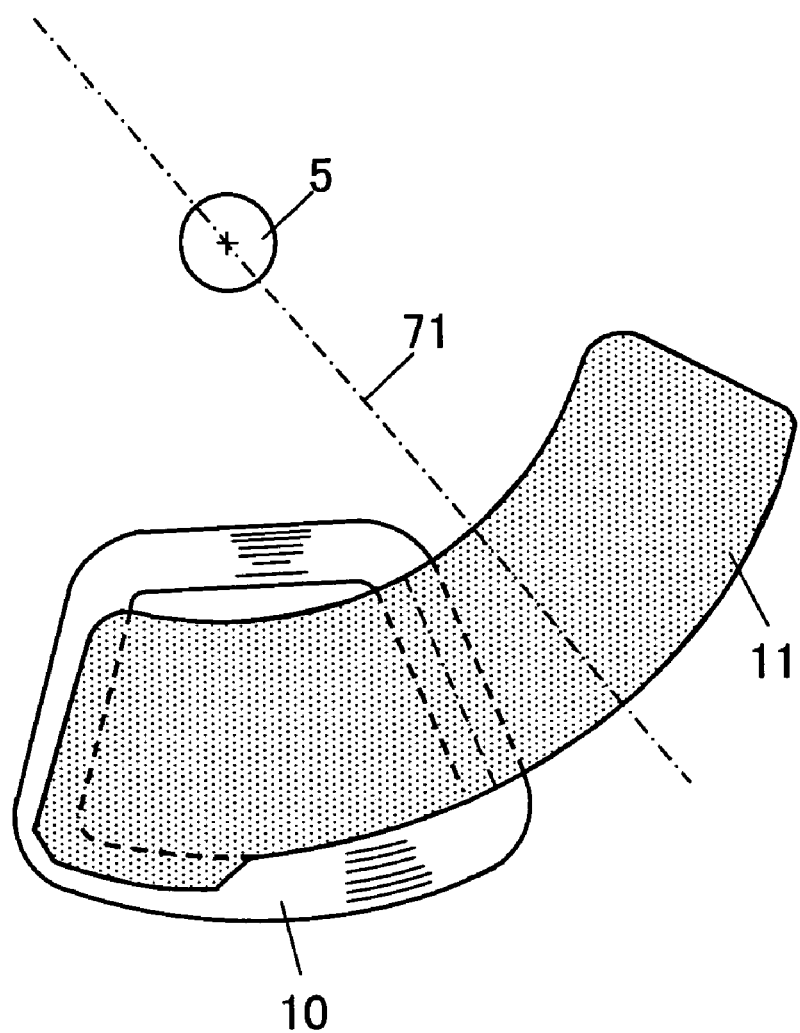
FIG. 8 is a partly enlarged plan view showing the voice coil and magnet of a VCM of the disk drive in the preferred embodiment of the present invention.

FIG. 1 to FIG. 8 describe the actuator gripping device of the disk drive in the preferred embodiment of the present invention. FIG. 1 is a plan view showing the configuration of an essential portion of the disk drive with the actuator at the shunt position (parking position). FIG. 2 is a schematic side view showing the configuration of the actuator. FIG. 3 is an exploded perspective view showing the configuration of the actuator. FIG. 4 is a partly enlarged plan view showing the vicinity of the ramp block with the actuator at the shunt position. FIG. 5 is a partly enlarged sectional view showing the ramp, tab and recording medium cut along the cover portion of the ramp block. FIG. 6 is an enlarged sectional view showing the shape of the tab. FIG. 7 is an explanatory diagram showing the forces given by the tab to push the first stepped side surface of the ramp when subjected to shocks acting to rotate the actuator toward the recording medium. FIG. 8 is a partly enlarged plan view showing the voice coil and magnet as viewed from the magnet side of VCM.

A magnetic disk drive will be described in the following as an example of a disk drive.

In FIG. 1, recording medium 4 with a recording medium layer formed on the surface thereof is mounted at rotor hub 3 fixed on rotary shaft 2 of a spindle motor (not shown) which rotates around rotational center 1. On the other hand, actuator 7 being a signal conversion element oscillating arm which is rotatable about rotary shaft 5 via bearing 6 is provided with tab 8 at one end thereof, and read and/or write head 9 mounted with a magnetic head (not shown) being a signal conversion element via a gimbal mechanism (not shown) at the rotary shaft 5 side from the tab 8, and with voice coil 10 at the other end, which rotates in a direction parallel with the surface of recording medium 4 about the rotary shaft 5. And, ramp block 15 having ramp 14 provided with a guide is disposed on a chassis or other casing so that the actuator 7 is vertically guided by the guide in contact with the tab 8 disposed on the actuator 7. Also, upper yoke 12 with magnet 11 fixed thereon is fitted on a chassis or other casing (not shown) above the voice coil 10 so as to be opposed to the voice coil 10, that is, at the opposite side of the recording medium 4 against the actuator 7 provided with the voice coil 10, and also, thereunder is disposed lower yoke 13 fitted on a chassis or other casing, opposing to the voice coil 10 so as to sandwich the voice coil 10. Further, a VCM (voice coil motor) is configured with the voice coil 10, magnet 11 fixed on the upper yoke opposing to the voice coil 10, and lower yoke 13. With a current applied to the voice coil 10 opposed to the magnet 11, the VCM operates, then the actuator 7 is rotated in a radial direction of the recording medium 4. When the magnetic disk drive is operating, the actuator 7 rotates about the rotary shaft 5, moving on the data recorded zone of the recording medium 4, and when the magnetic disk drive stops operating, the actuator 7 is rotated clockwise and moved to the specified position of the ramp 14 that is the shunt (parking) position of the actuator 7.

Next, the configuration of the actuator 7 will be described in the following with reference to FIG. 2 and FIG. 3. In FIG. 2 and FIG. 3, read and/or write head 9 mounted with a magnetic head (not shown) via gimbal mechanism 22 is disposed on head support arm 21 having tab 8 at one end and hole 21a at the other end, forming head support arm unit 23. With the read and/or write head 9 arranged via the gimbal mechanism 22, disposing dimple 21b on the underside of the head support arm 21 so as to touch the vicinity of the central portion of the read and/or write head 9, the dimple 21b abuts nearly the center of the top surface (opposite to the surface where the magnetic head is mounted) of the gimbal mechanism 22 or the read and/or write head 9, and thereby, it is possible to flexibly follow up unnecessary vibration or the like in the direction of roll or pitch against the recording medium 4 of the read and/or write head 9 during operation of the magnetic disk drive. Further, the voice coil 10 is fitted to voice coil holder 24 having hole 24a, and voice coil section 26 with balancer 25 fixed on the opposite side of the hole 24a across the voice coil 10 is secured on the head support arm unit 23, which configures actuator sub-unit 27. The head support arm unit 23 and the voice coil section are described as separate members, but the present invention is not limited to this configuration. It is preferable to integrate the members into one unit.

On the other hand, one end of spring plate 28 that is an elastic means double-folded into a nearly annular shape as viewed from above and a nearly Z-shape as viewed from the side is fixed to pivot pedestal (pivot bearing) 30 having a pair of abutments 30a, 30b and hole 30c via semi-circular spring fixing member 29. Further, the spring plate 28 is passed through the hole 21a of the head support arm 21, and the paired abutments 30a, 30b of the pivot pedestal 30 are abutted on the top surface of the head support arm 21 to fix the other end of the spring plate 28 on the underside of the head support arm 21, and thereby, via the spring plate 28 and the paired abutments 30a, 30b, the actuator sub-unit 27 having the head support arm 21 as its component element and the pivot pedestal 30 are elastically connected to each other by the spring plate 28 being an elastic means. Also, the spring plate 28 serves to push down the tab 8 of the head support arm 21 of the actuator sub-unit 27 about connecting portions $P_1$, $P_2$ with respect to the paired abutments 30a, 30b of the pivot pedestal 30, and the top surface of the head support arm 21, which configures the actuator arm 31. Accordingly, in operation of the magnetic disk drive, when the read and/or write head 9 fitted on the head support arm unit 23 via the gimbal mechanism 22 is floating from the surface of the recording medium 4, the load of the read and/or write head 9 is generated due to the compressive stress toward the recording medium 4 as a reactive force due to the deformation of the spring plate 28 against the head support arm unit 23 due to the respective connecting portions $P_1$ and $P_2$ of the paired abutments 30a and 30b of the pivot pedestal 30, then the read and/or write head 9 floats because of the relationship between the activating force toward the recording medium 4, applied to the read and/or write head 9, and the floating force in the reverse direction, causing the spring plate 28 to be deformed and keeping a constant space between the read and/or write head 9 or magnetic head and the recording medium 4, thereby executing the recording/reproducing operation of the magnetic disk drive.

Further, cylindrical bearing 32 with a hollow collar comprising flange 32a at one end having an outer diameter larger than the inner diameter of the hole 30c of the pivot pedestal 30, thread 32b at the other end having an outer diameter smaller than the inner diameter of the hole 30c of the pivot pedestal 30, and cylinder 32c having an outer diameter for fitting in the hole 30c of the pivot pedestal 30 between the flange 32a and thread 32b is set through the hole 30c of the pivot pedestal 30, the semi-circular inner side of the spring fixing member 29, the annular inner side of the spring plate 28, and the hole 24a of the voice coil holder 24. On the other hand, the hollow collar 33 having an inner diameter for engaging the cylinder 32c from the opposite side of the flange 32a, an outer diameter for passing through the hole 24a of the voice coil holder 24, and provided with semi-circular projection 33a which is similar in shape as the portion where the spring plate 28 that is nearly Z-shaped as viewed from the side abuts the spring fixing member 29 is inserted to be engaged with the cylinder 32c of the bearing 32 in such manner that the projection 33a is at the flange 32a side of the bearing 32, making the top surface 33b of the projection 33a come in contact with the nearly annular planar portion of the spring plate 28 fastened to the spring fixing member 29, then the collar 33 is integrated with the flange 32a of the bearing 32 together with the spring fixing member 29 and the planar portion of the spring plate 28 securely being in contact with the spring fixing member 29 by means of the nut 34, thereby configuring the actuator 7.

Next, the positions of paired abutments 30a and 30b of the pivot pedestal 30 configuring the actuator 7 will be described in the following. The line connecting the connecting portion $P_1$ and the connecting portion $P_2$ at which the abutment 30a and abutment 30b respectively come in contact with the top surface of the head support arm 21 passes through the axial center of the rotary shaft 5 of the actuator 7 shown in FIG. 1, and is also perpendicular to the center line 16 in the lengthwise direction of the actuator 7 shown in FIG. 1. It is desirable to make the arrangement so that the connecting portion $P_1$ and the connecting portion $P_2$ are symmetrical to each other with respect to the axial center of the rotary shaft 5 of the actuator 7, making the center of the line that connects the connecting portion $P_1$ and the connecting portion $P_2$ nearly aligned with the axial center of the rotary shaft 5. Due to such configuration, the actuator sub-unit 27 of the actuator 7 can be rotated in a direction perpendicular to the surface of the recording medium 4 around the line connecting the connecting portion $P_1$ and the connecting portion $P_2$ of the abutment 30a and the abutment 30b, and the read and/or write head 9 mounted on the head support arm 21 of the actuator sub-unit 27 is activated toward the recording medium 4.

Further, the mass (weight) of balancer 25 is set so as to align the center of gravity of the actuator 7 nearly with the center of the line connecting the connecting portions $P_1$ and $P_2$ of the pivot pedestal 30 which abuts the top surface of the head support arm 21 of the actuator sub-unit 27, and then the balancer 25 is fixed on one end of the voice coil holder 24 of the voice coil section 26. That is, when the actuator 7 is configured, the center of gravity of the actuator 7 is nearly aligned with the axial center of the rotary shaft 5 of the actuator 7. Approximately, the center of gravity of the actuator sub-unit 27 is preferably nearly aligned with the axial center of the rotary shaft 5 as described above because the deflection from the center of gravity of the actuator 7 at that time causes no problems in practical use. Also, the balancer 25 is fixed on one end of the voice coil holder 24 as described above, but it is sometimes required to dispose it at the read and/or write head 9 of the head support arm unit 23 depending upon the mass (weight) of the component parts of the actuator 7.

With the actuator 7 configured as described above, it is possible to form the head support arm 21 of the actuator 7 by using a material of high rigidity. Accordingly, the shock resistance against great external shocks can be improved and also the resonance frequency of the head support arm 21 can be enhanced, and there is no conventional problem like generation of vibration mode and no need of settling operation, and consequently, it is possible to execute high-speed rotation and positioning of the actuator 7 and to improve the access speed of the magnetic disk drive. Also, since the spring plate 28 being an elastic means is not integrally formed into one member as the head support arm 21 but provided as a separate member independent of the head support arm 21, it is possible to achieve the purposes such as increasing the load to the read and/or write head 9, improving the flexibility, and improving the rigidity of the structure which are incompatible with each other, thereby realizing independent actions of separate component elements. Accordingly, the design of the actuator 7 is simplified, and the freedom of design can be remarkably expanded. Also, there is no need of very accurate forming of the spring plate as in the conventional head support arm, and it is easier to form the head support arm as compared with the conventional one, and further, the thickness, material or the like for the spring plate 28 can be individually determined, and it is also possible to set the strength and spring constant of the spring plate 28 to desired values.

When the magnetic disk drive is stopped, the actuator 7 is rotated about the rotary shaft 5 and moved outside the recording medium 4, which is a so-called load/unload system and is well-known. Then, ramp 14 for guiding the actuator 7 to the shunt (parking) position in the unloading operation will be described in the following.

In FIG. 4 and FIG. 5, the ramp block 15 fitted to a chassis or other casing includes ramp 14 horizontally protruded from the side of ramp mounting portion 41 and cover portion 42, which is disposed in such manner that the ramp 14 partially overlaps the recording medium 4 with a space vertically provided therebetween in the axial direction of the rotational center 1 of the recording medium 4. And, the ramp 14 includes top surface 43 formed of first slope 14a, first plane 14b, second slope 14c, first stepped side surface (first stepped side wall) 14d, second (maintaining) plane 14e, and second stepped side surface (second stepped side wall) 14f. The tab 8 of the head support arm 21 of the actuator 7 abuts the top surface 43 of the ramp 14, thereby guiding the actuator 7. Also, the cover portion 42 is formed in such manner that the space between the underside thereof and the first plane 14b of the ramp 14 is larger than the size of the tab 8 of the head support arm 21 which passes through the space. It is not always necessary to provide the second slope 14c.

The first plane 14b and the second plane 14e of the ramp 14 are on a plane parallel with the plane perpendicular to the rotary shaft 5, while the first stepped side surface 14d is on a plane having an angle of $(90+\alpha)°$ to the second plane 14e, and the height in the axial direction of rotary shaft 5 is at least higher than the height in the axial direction of rotary shaft 5 of the tab 8 of the head support arm 21. Also, the second stepped side surface 14f is on a plane nearly perpendicular to the second plane 14e, and its height is higher than the position of the first plane 14b. As is already known, in case a chassis or other casing or structural member is provided with a stopper (not shown) which abuts the end of voice coil holder 24 in order to prevent the actuator 7 from rotating toward the opposite side of the recorded zone of the recording medium 4 and moving off from the ramp 14, then it is not always necessary to provide the second stepped side surface.

When a stop command is inputted to the magnetic disk drive, with the recording medium 4 kept rotating, a current is applied to the VCM to rotate the actuator 7 clockwise and move it outside the recording medium 4. At the vicinity of the outer periphery of the recording medium 4, the tab 8 of the head support arm 21 of the actuator 7 abuts the first slope 14a of the ramp 14, and further, as the actuator 7 rotates clockwise, the tab is guided onto the first slope 14a, the first plane 14b, the second slope 14c, the first stepped side surface 14d, and the second plane 14e of the ramp 14 in order. When it is guided onto the second plane 14e, the actuator 7 stops rotating, and the actuator 7 comes to the shunt position (parking position) on the second plane 14e. The rotation of the recording medium 4 stops while the actuator 7 is guided on the top surface 43 of the ramp 14 or after it is guided to the shunt position.

When the tab 8 of the head support arm 21 of the actuator 7 at the shunt position is in contact with the second plane 14e, the tab 8 produces activating force $F_1$ to push the second plane 14e because of the spring plate 28 of the actuator 7.

Also, the shape of the tab 8 of the head support arm 21 which slides on the top surface of the ramp 14 thus configured will be described. To let it slide on the first slope 14a, the first plane 14b, the second slope 14c and the first stepped side surface 14d of the ramp 14, it is necessary to make the outer periphery of the tab 8 shaped so as to be free of catches such as edges over at least a half of the periphery, and the shape is desirably semi-circular or cylindrical over at least a half of the periphery. Also, it is not limited to a cylindrical shape, and the shape is preferably oval or partially oval, provided that the shape has smoothly curved surfaces. The head support arm 21 having the tab 8 is usually formed from a plate material, and its sectional shape is generally rectangular, but as shown in FIG. 6 (a), it is preferable to finish the outer periphery into a semi-circular shape by using a well-known machining method such as a press machining process. Also, as shown in FIG. 6 (b) and FIG. 6 (c), it is preferable to integrally form the plate-like tab 8 with use of a material such as resin so that it has a semi-circular or cylindrical outer shape.

In the above description, the ramp block 15 having the ramp 14 which guides the actuator 7 to the shunt position is disposed in the vicinity of the outer periphery of the recording medium 4, but the present invention is not limited to this configuration. As is already known, it is needless to say preferable to dispose the ramp block in the vicinity of the rotational center 1 of the recording medium 4 by fitting it to a fixed shaft in the case of using a shaft-fixed type spindle motor for rotating the recording medium 4 or to a structural member such as a casing of the device. In that case, it is configured in that the first stepped side surface 14d of the ramp 14 is disposed at the recorded zone side of the recording medium 4 of the second plane 14e.

Next, described is the resistance to great external shocks such as shocks caused by dropping of the magnetic disk drive, vibration produced during transportation, or shocks due to bumping against other objects in stop mode of the magnetic disk drive.

The actuator 7 rotating about the rotary shaft 5 is subjected to a linear acceleration and angular acceleration due to great external shocks applied to the magnetic disk drive. The shock caused by the linear acceleration acts at the center of gravity of the actuator 7, and the level of the shock depends upon the weight of the actuator 7. Also, the shock caused by the angular acceleration acts as couple of forces at the center of the rotary shaft 5, and the level of the couple of forces caused by the shock depends upon the inertia moment of the actuator 7. On the other hand, as described above, since the center of gravity of the actuator 7 is set so as to be nearly aligned with the axial center of the rotary shaft 5 of the actuator 7, the shock due to the linear acceleration acts at the axial center of the rotary shaft 5, and there is almost no force acting to rotate the actuator 7 about the rotary shaft 5 and the line connecting the connecting portion $P_1$ and connecting portion $P_2$ of abutment 30a and abutment 30b, and then the actuator 7 is hardly rotated. However, due to the component of force in the axial direction of the rotary shaft 5 of the shock caused by the linear acceleration, the actuator sub-unit 27, fixing member 20, spring plate 28 and collar 33 are subjected to axial forces of the rotary shaft 5, and the actuator sub-unit 27 is given forces to move in the axial direction of the rotary shaft 5 against the stress of the spring plate 28. Accordingly, even if the actuator sub-unit 27 is moved by forces acting to move it in the axial direction of the rotary shaft 5, causing the tab 8 of the head support arm 21 to float from the second plane 14e of the ramp 14, it returns to the original before-move position on the second plane 14e of the ramp 14 when restored with the movement ended. Also, the couple of forces generated due to the shock caused by the angular acceleration acts to rotate the actuator 7 around the rotary shaft 5 so as to move the actuator 7 against the friction due to the pressure (the activating force $F_1$) of the tab 8 of the head support arm 21 to the second plane 14e of the ramp 14. Accordingly, the force to move the read and/or write head 9 mounted on the actuator 7 from the shunt position of the actuator 7 in the direction of the recording medium 4 or in the opposite direction due to great external shocks in stop mode of the magnetic disk drive is generated by the shock caused by the angular acceleration of the shock.

Accordingly, in order to prevent the tab 8 of the head support arm 21 from moving toward the recording medium 4 on the first stepped side surface 14d formed so as to have an angle of $\theta=(90+\alpha)°$ to the second plane 14e of the ramp 14 or the plane nearly perpendicular to the rotary shaft 5 when a great external shock is given to rotate the actuator 7 toward the recording medium 4, as shown in FIG. 7 showing an active force applied to the first stepped side surface 14d at contact S at which the tab 8 abuts the first stepped side surface 14d of the ramp 14, couple of forces $F \sin \alpha$ in the direction of the first stepped side surface 14d of angular acceleration shock F caused by the shock given to the tab 8 is required to be smaller than the total of friction force $\mu(F \cos \alpha + F_1 \sin \alpha)$ (where $\mu$ is the friction coefficient between the first stepped side surface 14d and the tab 8) due to couple of forces $F \cos \alpha$ in a direction perpendicular to the first stepped side surface 14d of the angular acceleration shock F caused by the shock given to the tab 8 and couple of forces $F_1 \sin \alpha$ in a direction perpendicular to the first stepped side surface 14d of the activating force $F_1$ of the tab 8, and couple of forces $F_1 \cos \alpha$ in the direction of the first stepped side surface 14d of the activating force $F_1$ of the tab 8 against the second plane 14e. That is, it is preferable to satisfy (formula 1).

$$F \sin \alpha \leq \mu(F \cos \alpha + F_1 \sin \alpha) + F_1 \cos \alpha \quad \text{(formula 1)}$$

On the other hand, since $\mu>0$, $F_1>0$, $\sin\alpha\geqq0$, $\cos\alpha\geqq0$, (formula 2) is established as follows:

$$\mu F_1 \sin\alpha + F_1 \cos\alpha > 0 \quad \text{(formula 2)}$$

Therefore, (formula 3) can be obtained.

$$\mu F \cos\alpha < \mu(F\cos\alpha + F_1\sin\alpha) + F_1\cos\alpha \quad \text{(formula 3)}$$

Accordingly, when (formula 4) is satisfied at least, the tab 8 will not move toward the recording medium 4.

$$F\sin\alpha \leqq \mu F\cos\alpha \quad \text{(formula 4)}$$

Therefore, the first stepped side surface 14*d* is configured so as to satisfy (formula 5) with respect to the plane perpendicular to the second plane 14*e*.

$$\alpha \leqq \tan^{-1}\mu \quad \text{(formula 5)}$$

Accordingly, (formula 6) is satisfied with respect to the second plane 14*e*.

$$90 \leqq \theta = (90+\alpha) \leqq 90+\tan^{-1}\mu \quad \text{(formula 6)}$$

As an example, when $\mu\geqq 0.2$, then $\alpha\leqq 11°$, and with the first stepped side surface 14*d* of the ramp 14 formed so as to have an angle $$\theta = 90° \text{ to } 100°$$

to the second plane 14*e*, the tab 8 of the head support arm 21 is prevented from moving toward the recording medium 4 by the first stepped side surface 14*d* of the ramp 14.

Also, it is configured in that when subjected to a shock that causes the actuator 7 to move off from the recording medium 4, the second stepped side surface 14*f* of the ramp 14 becomes a plane nearly perpendicular to the second plane 14*e*, that is, nearly perpendicular to the plane perpendicular to the axial center of the rotary shaft 5 of the actuator 7. Further, since the ramp block 15 is provided with cover portion 42, even if a force acting to move the actuator 7 off from the recording medium 4 is given due to great external shocks, the rotational motion is blocked by the second stepped side surface 14*f* and the cover portion 42, and the actuator will not move off from the second plane 14*e* that defines the shunt position.

Next, described is the movement of the actuator 7 toward the recording medium 4 from the second plane 14*e* that defines the shunt position (parking position) in loading operation at start of the operation when an operational command is given to the magnetic disk drive.

First, described is the function of magnet 11 attached to the upper yoke 12 opposing to the voice coil 10 of the VCM fixed on the voice coil holder 24 of the actuator 7. As shown in FIG. 8, the shape of magnet 11 is set and the magnet is attached to the upper yoke 12 so that the magnet 11 is excited with the boundary of N pole and S pole of the magnet 11 opposed to the center line 71 in the peripheral direction of rotation of the voice coil 10 at the position of actuator 7 with the magnetic head (not shown) positioned at the center of the recorded zone of the recording medium 4, and that the width of magnet 11 in the radial direction of rotary shaft 5 when the actuator is at the shunt position is larger than the width of magnet 11 in the radial direction of rotary shaft 5 or the lengthwise direction of actuator 7 corresponding to the operational range of the voice coil 10 when the actuator 7 is operating within the recorded zone of the recording medium 4.

Figure 9:
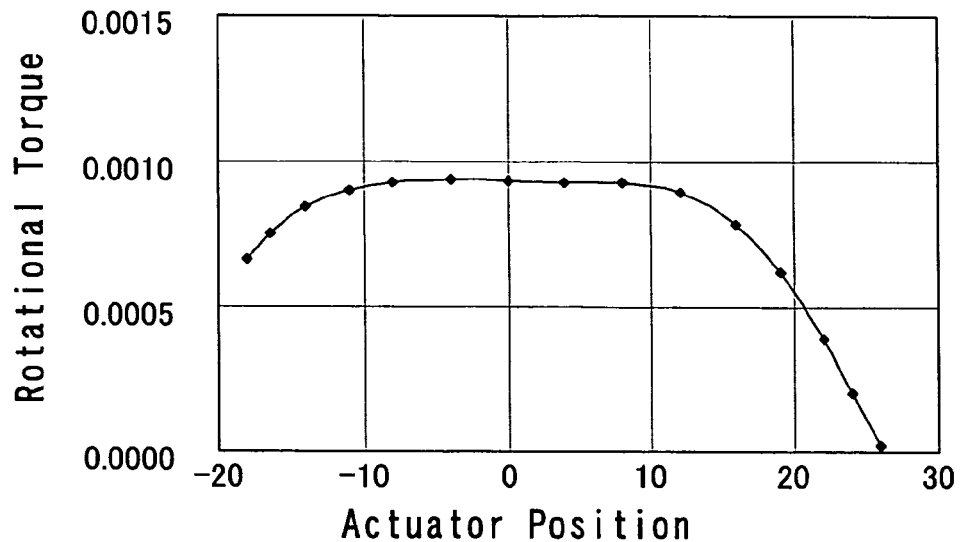
FIG. 9 (*a*) is a graph showing the relationship between the rotational angle position of the actuator and the rotational torque by the VCM in the preferred embodiment of the present invention.
Figure 9:
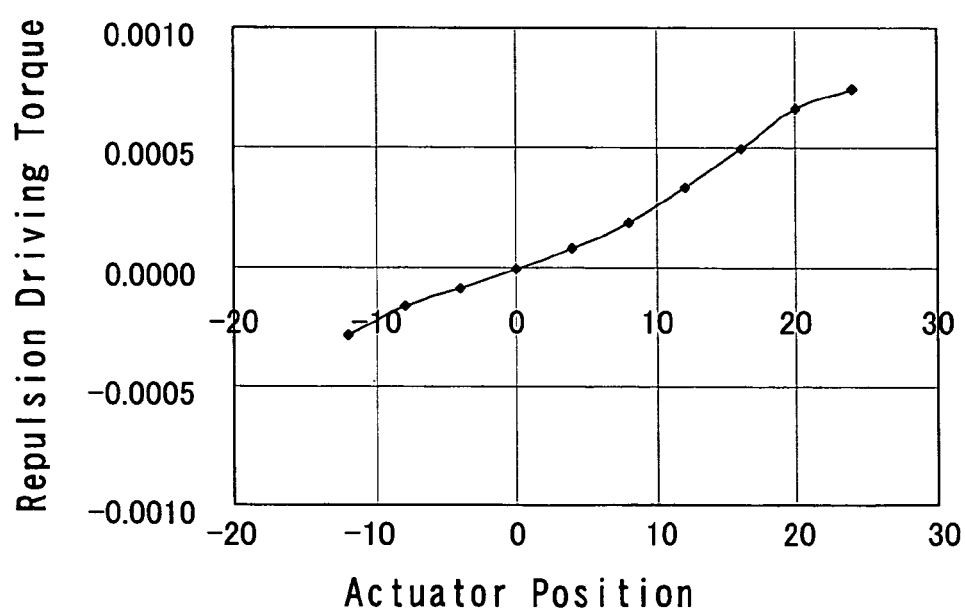

When the voice coil 10 is supplied with a current, the actuator 7 is rotated by the VCM, and a magnetic force is generated according to the Fleming's rule between the voice coil 10 and the magnet 11, and then the rotational direction of actuator 7 and the direction of repulsion (attraction) toward the magnet 11 are determined depending upon the direction of current applied to the voice coil 10 and the polarity of magnet 11 opposing to the voice coil 10. An example of rotating torque to the actuator 7 generated by the VCM with a constant current applied to the voice coil 10 and an example of repulsion driving torque in a direction opposite to the magnet 11 are shown in FIG. 9 (*a*) and FIG. 9 (*b*) respectively. FIG. 9 (*b*) shows repulsion driving torque generated when a load operation command is given to the VCM. Also, in FIG. 9 (*a*) and FIG. 9 (*b*), the position of the VCM of the actuator 7 with the magnetic head (not shown) positioned at the center of the recorded zone of the recording medium 4 corresponds to the origin of the horizontal axis, and the rotational angle of the VCM of which the direction of shunt position of the actuator 7 from the position is positive (+) corresponds to the horizontal axis.

When an operation command is given to the magnetic disk drive, the voice coil 10 is supplied with a current, and as shown in FIG. 9 (*a*), the actuator 7 is rotated by the rotational torque of the VCM toward the recording medium 4. Simultaneously, as shown in FIG. 9 (*b*), the repulsion driving torque of the VCM is given to the actuator 7, then the tab 8 of the head support arm 21 acts to move the actuator upward from the second plane 14*e* of the ramp 14. In that case, a force is generated by the rotational torque of the VCM to move the actuator 7 toward the recording medium 4, and at the tab 8 of the head support arm 21 of the actuator 7, horizontal driving force $F_3$ acts to push the tab 8 toward the first stepped side surface 14*d* of the ramp 14. Also, the repulsion driving torque of the VCM serves as torque to rotate the actuator 7 around the line connecting the connecting portion $P_1$ and connecting portion $P_2$ of the abutment 30*a* and abutment 30*b* in a direction perpendicular to the surface of the recording medium 4, and then vertical driving force $F_4$ to move the tab 8 upward acts on the tab 8.

Figure 10:
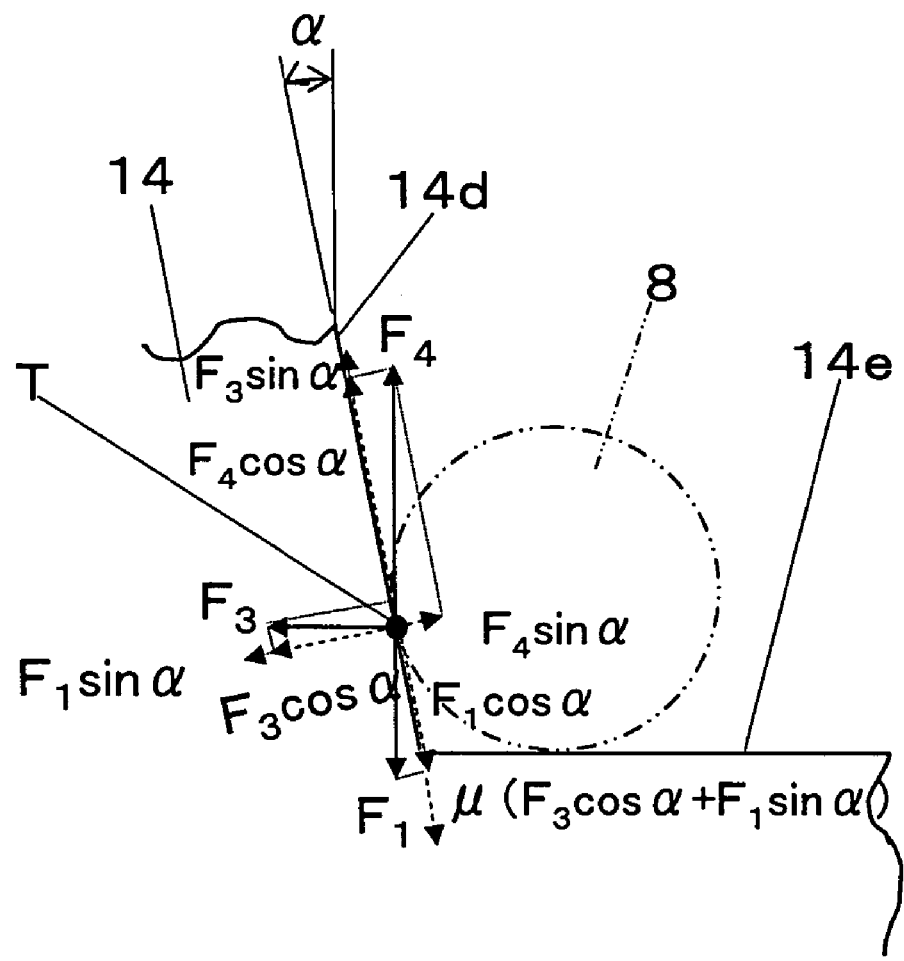
FIG. 10 is an explanatory diagram showing the active force of the tab which pushes the stepped side surface of the ramp at start of the disk drive operation in the preferred embodiment of the present invention.

In FIG. 10 is shown the active force of the tab 8 which pushes the first stepped side surface 14*d* at contact T at which the tab abuts the first stepped side surface 14*d* of the ramp 14. The activating force $F_1$ given to the tab 8 and the horizontal driving force $F_3$ by the VCM serve as pushing forces against the first stepped side surface 14*d*. On the other hand, the vertical driving force $F_4$ by the VCM serves as a separating force to separate the tab 8 from the first stepped side surface 14*d*. Accordingly, it is possible to set the vertical driving force $F_4$ capable of rotating the actuator 7 from the shunt position toward the recording medium 4 beyond the first stepped side surface 14*d* of the ramp 14 according to the relationship between the pushing component of force $f_1$ in a direction perpendicular to the first stepped side surface 14*d* of the pushing force given to the first stepped side surface 14*d* and the separating component of force $f_2$ in a direction perpendicular to the first stepped side surface 14*d* of the separating force of the tab 8.

The pushing component of force $f_1$ and the separating component of force $f_2$ in a direction perpendicular to the first stepped side surface 14*d* are respectively as shown by (formula 7) and (formula 8).

$$f_1 = F_1 \sin\alpha + F_3 \cos\alpha \quad \text{(formula 7)}$$

$$f_2 = F_4 \sin\alpha \quad \text{(formula 8)}$$

Accordingly, when the relationship between the pushing component of force $f_1$ and the separating component of force $f_2$ satisfies (formula 9), the tab 8 does not act to push the first stepped side surface 14*d*.

$$f_1 \leqq f_2 \quad \text{(formula 9)}$$

Therefore, the vertical driving force $F_4$ by the VCM for rotating the actuator 7 from the shunt position toward the recording medium 4 beyond the first stepped side surface 14d of the ramp 14 is preferably set so as to satisfy (formula 10).

$$F_4 \geq F_1 \quad \text{(formula 10)}$$

Also, when the relationship between pushing component of force $f_1$ and separating component of force $f_2$ is as shown by (formula 11), $$f_1 > f_2 \quad \text{(formula 11)}$$

for achieving the purpose of rotating the actuator 7 toward the recording medium 4 beyond the first stepped side surface 14d, it is preferable to be configured in that the component of force $f_6$ in the direction of the first stepped side surface 14d of the vertical driving force $F_4$ by VCM is greater than the anti-resultant force $f_5$ with the frictional force $f_3$ against the first stepped side surface 14d by the pushing component of force $f_1$ and separating component of force $f_2$ added to the component of force $f_4$ in the direction of the first stepped side surface 14d of the activating force $F_1$ of the tab 8. That is, the frictional force $f_3$ and the component of force $f_4$ can be represented by (formula 12) and (formula 13) respectively.

$$f_3 = \mu(f_1 - f_2) = \mu(F_1 \sin\alpha + F_3 \cos\alpha - F_4 \sin\alpha) \quad \text{(formula 12)}$$

$$f_4 = F_1 \cos\alpha \quad \text{(formula 13)}$$

Therefore, the anti-resultant force $f_5$ is as shown by (formula 14).

$$\begin{aligned} f_5 &= f_3 + f_4 \quad \text{(formula 14)} \\ &= F_1 \cos\alpha + \mu(F_1 \sin\alpha + F_3 \cos\alpha - F_4 \sin\alpha) \end{aligned}$$

On the other hand, the component of force $f_6$ in the direction of the first stepped side surface 14d of the vertical driving force $F_4$ can be represented by (formula 15).

$$f_6 = F_4 \cos\alpha \quad \text{(formula 15)}$$

Therefore, for rotating the actuator 7 toward the recording medium 4 from the shunt position beyond the first stepped side surface 14d of the ramp 14, it is preferable to be configured in that the relationship between the component of force $f_6$ and the anti-resultant force $f_5$ in the direction of the first stepped side surface 14d of the vertical driving force $F_4$ by the VCM satisfies (formula 16).

$$F_4 \cos\alpha > F_1 \cos\alpha + \mu(F_1 \sin\alpha + F_3 \cos\alpha - F_4 \sin\alpha) \quad \text{(formula 16)}$$

Therefore, (formula 17) can be obtained.

$$F_4 > F_1 + \mu(F_1 \tan\alpha + F_3 - F_4 \tan\alpha) \quad \text{(formula 17)}$$

where $F_4 > 0$
$\tan\alpha \geq 0$
And, (formula 18) can be obtained.

$$F_1 + \alpha(F_1 \tan\alpha + F_3) > F_1 + \mu(F_1 \tan\alpha + F_3 - F_4 \tan\alpha) \quad \text{(formula 18)}$$

Therefore, the vertical driving force $F_4$ by the VCM is as shown by (formula 19).

$$F_4 > F_1 + \mu(F_1 \tan\alpha + F_3) \quad \text{(formula 19)}$$

Accordingly, setting the vertical driving force $F_4$ by the VCM so as to satisfy the (formula 19), it is possible to rotate the actuator 7 from the shunt position toward the recording medium 4 beyond the first stepped side surface 14d of the ramp 14.

Also, as shown in FIG. 9 (b), since the repulsion driving torque is very large when the actuator 7 is in the vicinity of the shunt (parking position, and the repulsion driving torque becomes very small when the actuator is moving on the recorded zone of the recording medium 4, no bad influences will be given to the recording/reproducing operation of the magnetic disk drive.

Since the magnetic disk drive is configured with the actuator 7, the VCM and ramp block 15 as described above, even if the magnetic disk drive in stop (non-operation) mode is subjected to great external shocks, the tab 8 of the head support arm 21 provided with the read and/or write head 9 of the actuator 7 will not move off from the second plane 14e of the ramp 14. Also, when the magnetic disk drive is operated, since the magnet 11 is disposed at the opposite side of the recording medium 4 against the actuator 7 provided with the voice coil 10 of the VCM, which is therefore opposed to the voice coil 10, the tab 8 will easily move off from the second plane 14e of the ramp 14 and is able to rotate the actuator 7 with the read and/or write head 9 opposed to the surface of the recording medium 4, and thereby, the magnetic driving disk executes the recording/reproducing operation. Thus, no individual members for a gripping mechanism are necessary for the recording/reproducing operation of the magnetic disk drive, requiring no cost and space for a gripping mechanism, and it is possible to realize a magnetic disk drive which is inexpensive and small-sized.

In the above description, the shunt position of the actuator 7 is outside the recording medium 4, and then the magnet 11 is arranged at the opposite side of the recording medium 4 with respect to the actuator 7 provided with the voice coil 10, which is therefore opposed to the voice coil 10. However, as shown in FIG. 11, another VCM can be configured by providing a shunt position 103 of actuator 7 corresponding to the ramp block 15 being disposed inside the recording region of recording medium 4, that is, in the vicinity of rotational center 1 of recording medium 4, providing another magnet 105 at recording medium 4 side with respect to actuator 7 provided with the voice coil of voice coil 26, and providing another voice coil 104 opposite to the magnet 105.

Figure 11:
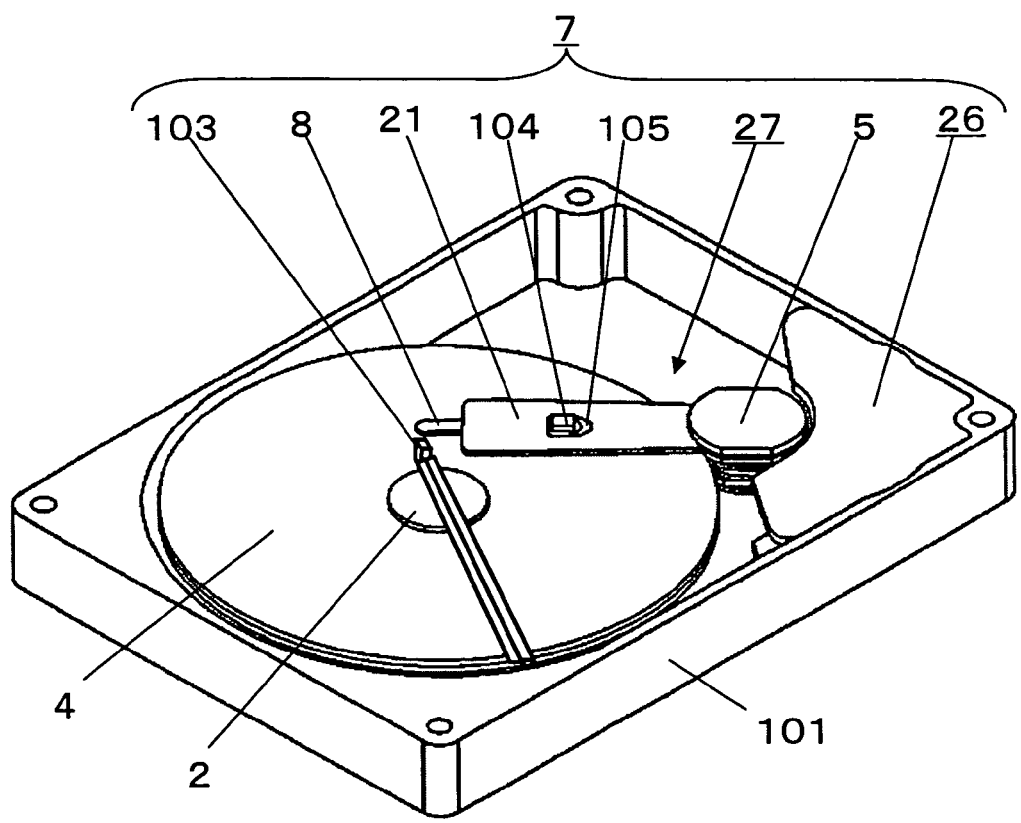
FIG. 11 is a perspective view of the outlined configuration of an essential portion of another magnetic disk drive in the preferred embodiment of the present invention.

In FIG. 11, the same elements corresponding to those in FIG. 1 and FIG. 2 are given the same reference numerals, and actuator sub-unit 27 of actuator 7 is rotatably supported for rotation about rotary shaft 5 having a bearing, which can be positioned to the predetermined track position of recording medium 4 by driving the VCM that is a rotation driving means. Actuator 7 is composed of actuator sub-unit 27, the bearing with rotary shaft 5, and voice coil 26. As a rotation driving means, voice coil 26 as shown in FIG. 11 can be used, which aims to rotate head support arm 8 in a direction parallel to the surface of recording medium 4.

Also, regarding the configuration of shunt (parking) position 103 of actuator 7 corresponding to ramp block 15 in the vicinity of rotational center 1 of recording medium 4, nearly the same configuration as that shown in the sectional view of FIG. 5 can be used, and the description is omitted to avoid repetition.

Figure 12:
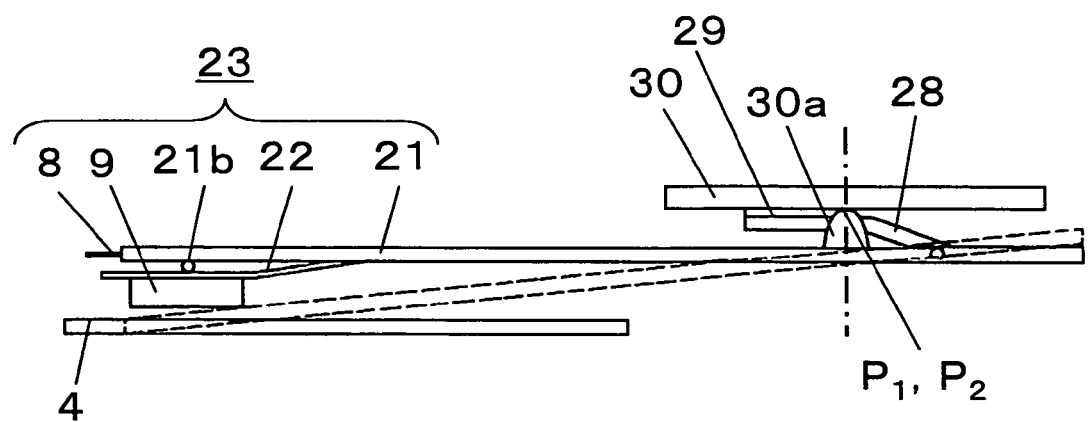
FIG. 12 is a side view of another configuration of an actuator of a magnetic disk drive in the preferred embodiment of the present invention.

Also, in the configuration of an actuator of a disk drive in the preferred embodiment of the present invention described above, as shown in FIG. 3, the configuration is such that a pair of pivots 30a, 30b being the junctions of pivot bearing 30 are respectively in contact with the top of head support arm 21 at abutting points $P_1$, $P_2$, but as shown in FIG. 12, it is also preferable to be configured in that a pair of pivots 30a, 30b being the junctions are disposed at head support arm 21 and respectively come in contact with the bottom of pivot bearing 30 at abutting points $P_1$, $P_2$. FIG. 12 is a partial side view showing another configuration of an actuator of a magnetic disk drive in the preferred embodiment of the present invention, which is an example of a configuration with the pivot disposed at the head support arm. In FIG. 12, the same reference numerals are given to the same elements corresponding to those in FIG. 3.

In FIG. 12, the bearing and voice coil are omitted, and also, a pair of pivots 30a, 30b being the junctions for the pivot bearing are disposed at the other end of head support arm 21 having tab 8 at one end, and pivots 30a, 30b being a pair of junctions are in contact with the bottom of pivot bearing 30 at abutting points $P_1$, $P_2$, and this configuration is only the difference from the configuration of an actuator shown in FIG. 3. The remainder of the configuration and operation are same as for the actuator described by using FIG. 1,FIG. 2 and FIG. 3, and the description is omitted to avoid repetition.

Figure 13:
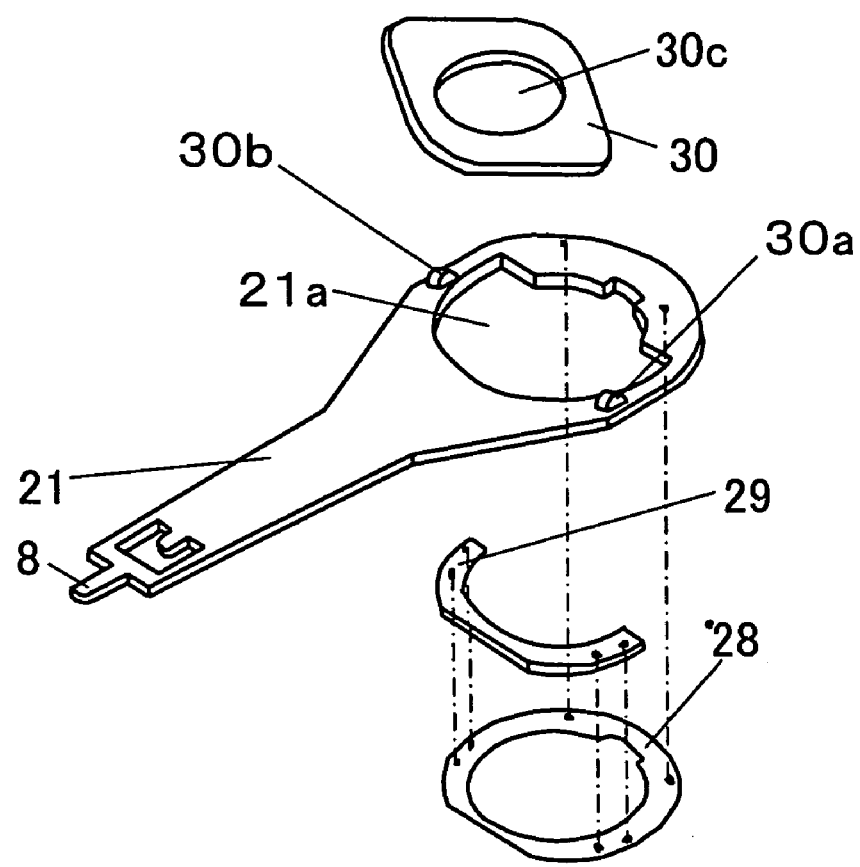
FIG. 13 is a partly perspective view showing the configuration of pivot bearing of an actuator shown in FIG. 12.
Figure 2:
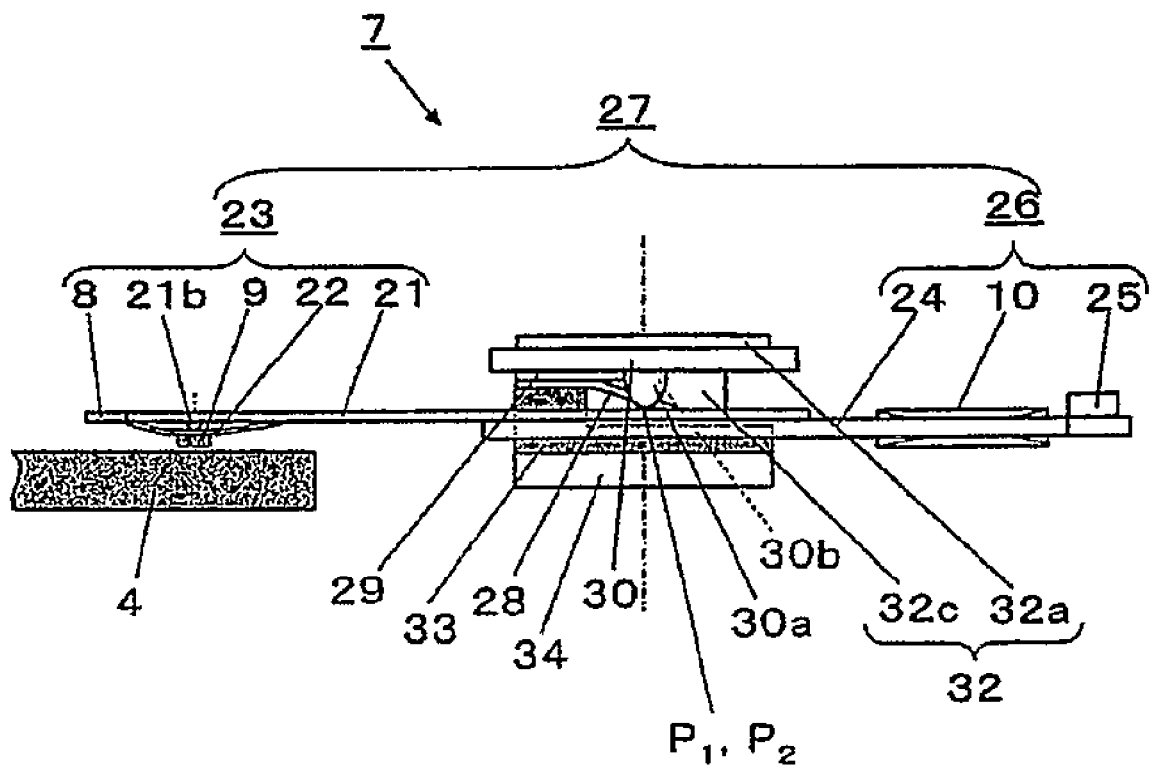
Figure 2:
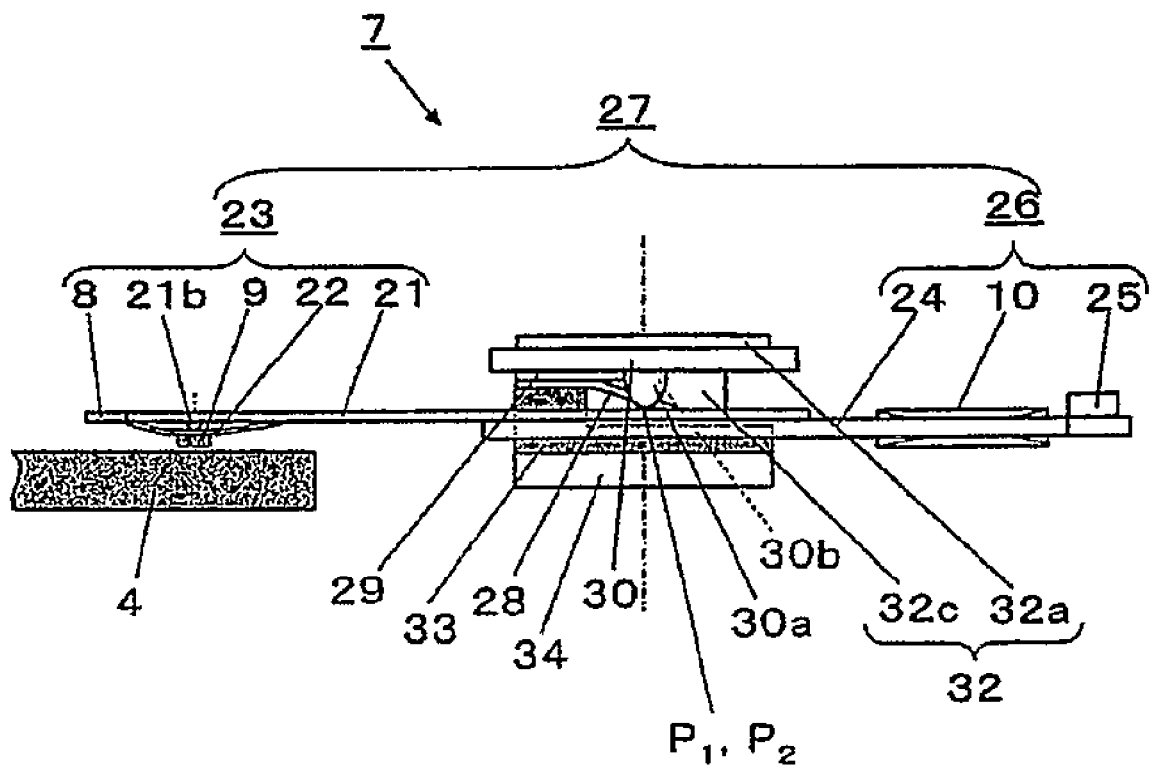

Also, in the above description, the shape of the pivot is not described, but it is preferable to use any shapes such as cones, polygonal pyramids, hemispheres, and semi-ellipsoids, provided that they come in contact with the first base arm 201 or head support arm 21 at the abutting points. Also, it is possible to use shapes such as semi-circular cylinders and semi-oval cylinders or to enable line contacting by using the ridge line of polyhedrons. In FIG. 13, an example of a pivot using semi-circular cylinder is shown.

In the configuration shown in FIG. 12, the ramp section for guiding the actuator in unloading operation to lead tab 8 to the shunt position is not shown, but in the magnetic disk drive in the preferred embodiment of the present invention, the actuator is configured in that a pair of pivots 30a, 30b being the junctions for the pivot bearing are disposed at the other end of head support arm 21 having tab 8 at one end, and a pair of pivots 30a, 30b being the junctions are in contact with the bottom of pivot bearing 30 at abutting points $P_1$, $P_2$, but it is certainly possible to apply the ramp as it is shown in FIG. 1, FIG. 4 and FIG. 5.

In the above description of the pivot pedestal 30 of the actuator 7 of the disk drive in the preferred embodiment of the present invention, the semi-oval circular abutments 30a and 30b are shown in FIG. 2 and FIG. 3, but the present preferred embodiment is not limited to this configuration. It is also preferable to be configured so as to have a shape having connecting portions $P_1$ and $P_2$ such as a semi-circular shape, square pyramid or conic shape so that the read and/or write head 9 can be rotated in a direction perpendicular to the recorded surface of the recording medium 4 with the connecting portions $P_1$ and $P_2$ of the respective peaks of the abutments and the top surface of the head support arm 21 as its support points when the line connecting the peaks of paired abutments is in a direction perpendicular to the center line in the lengthwise direction of the head support arm 21. Also, it is possible to use a bearing configuration with which the head slider 9 can be rotated in a direction perpendicular to the recorded surface of the recording medium 4 with use of a support line instead of the support point. Specifically, it is preferable to configure the bearing in a cleat-like shape on a line similar to the line connecting the peaks of the abutments in a direction perpendicular to the center line in the lengthwise direction of the support arm 21 instead of using a pair of abutments. Further, it is also possible to configure the bearing in a shape capable of forming a support line with the top surface of the support arm 21 such as a semi-cylinder or semi-oval shape.

In the above description of the preferred embodiment, a magnetic disk drive is explained as an example, but the embodiment is not limited to the device. It is of course preferable to use a non-contact type disk recording/reproducing device such as an optical magnetic disk drive and optical disk drive.

As described above, according to the preferred embodiment, it is possible to greatly expand the freedom of design of the actuator and to form the head support arm of the actuator by using a material of high rigidity, thereby improving the resistance to shocks such as great external shocks, and also, the load to the read and/or write head built in the actuator can be increased and the disk drive may show excellent shock resistance against vibrations or shocks externally given thereto during operation. Also, it is possible to increase the resonance frequency of the head support arm and to execute high-speed rotation and positioning of the actuator, thereby enabling the realization of an excellent disk drive which may assure high-speed access.

Also, when the disk drive is in stop (non-operation) mode, that is, when the actuator is kept at the shunt position, the actuator is subjected to the component of force in an axial direction of the rotary shaft due to the linear acceleration and the couple of force due to the angular acceleration at its gravity center when great external shocks are given thereto, causing the actuator to be moved, but the first stepped side surface or the second stepped side surface of the ramp is able to prevent the movement of the tab of the head support arm of the actuator and to hold the tab on the second plane of the ramp that is the shunt position of the actuator. Accordingly, the actuator so configured that the head support arm having a read and/or write head and tab are rotated is combined with a ramp provided with the first stepped side surface and the second stepped side surface respectively having side surfaces nearly perpendicular to the second plane at either side thereof, and there are provided a magnet fixed on an upper yoke at the opposite side of the recording medium across the actuator provided with a voice coil and a lower yoke at the recording medium side, thereby configuring a voice coil motor (VCM), and it is possible to realize an actuator or a gripping device of a signal conversion element oscillating arm which assures very high shock resistance. Also, when the operation of the disk drive is started, a repulsion driving torque is generated between the voice coil of VCM and the magnet, and the torque acts to move the actuator sub-unit around the line perpendicular to the center line in the lengthwise direction of the actuator, passing through the axial center of the rotary shaft of the actuator, then a force is generated to move up the tab at the end of the actuator sub-unit, and also, a force is generated to rotate the actuator around the rotary shaft, thereby causing the actuator to move off from the shunt position and to move toward the surface of the recording medium.

In such an actuator gripping mechanism, there is no need of individual members for gripping the actuator that is a signal conversion element oscillating arm, requiring no cost and space as a gripping mechanism, and it is possible to realize a disk drive which is inexpensive, small-sized, and capable of assuring excellent shock resistance.

As described above, in the present invention, a pivot pedestal with two abutments, and an actuator sub-unit with a tab formed at one end and a read and/or write head fitted via a gimbal mechanism, and with a voice coil and balancer at the other end, are elastically connected to each other with use of a spring plate that is a double-folded elastic means in such manner that the two abutments of the pivot pedestal abut the actuator sub-unit and that a stress is generated to push the tab of the actuator sub-unit downward (toward the surface of the recording medium) with the line connecting the butting points of the two abutments of the pivot pedestal and the top surface of the actuator sub-unit as its support point, thereby configuring an actuator arm, and the configuration of the actuator is such that the actuator arm is held between the flange of a cylindrical bearing with a hollow collar and a nut. Further, the two abutments of the pivot pedestal are formed in such manner that the line connecting the connecting portions of the two abutments of the pivot pedestal and the top surface of the actuator sub-unit passes through the axial center of the rotary shaft of the actuator and that the connecting portions are symmetrical to each other with respect to the axial center of the rotary shaft of the actuator. Also, the actuator is configured in that a balancer fixed on the actuator is set so that the gravity center of the actuator is at the center of the line connecting the connecting portions of the two abutments of the pivot pedestal.

Due to such actuator configuration, since the actuator sub-unit of the actuator arm and the spring plate for activating the actuator sub-unit mounted with a read and/or write head in the direction of the surface of the recording medium as a load are configured with separate members, the head support arm of the actuator sub-unit can be formed with a material of high rigidity and it is possible to improve the shock resistance to great external shocks and to enhance the resonance frequency of the actuator sub-unit. Further, the load to the read and/or write head built in the actuator can be increased, assuring high shock resistance to external vibrations or shocks during operation of the disk drive, and further, it is possible to realize an excellent disk drive which may assure a very high access speed.

Also, when a stop command is given to the disk drive, at the guide surface of the ramp top which guides the actuator being a signal conversion element oscillating arm to the shunt position, the ramp provided with the first stepped side surface and the second stepped side surface which are nearly perpendicular to the second plane respectively at either side of the second plane that is the shunt position of the actuator, and the actuator of which the center of gravity is at the central point of the line connecting the connecting portions of the two abutments of the pivot pedestal and the central point is nearly aligned to the axial center of the rotary shaft of the actuator, the voice coil motor (VCM) provided with the magnet fixed on the upper yoke at the opposite side of the recording medium and the lower yoke at the recording medium side, which configures the actuator gripping device, completing a disk drive configuration having such an actuator gripping device.

Due to the configuration of such an actuator gripping device, even when the disk drive is subjected to great external shocks in its stop mode, the tab of the actuator sub-unit of the actuator is prevented from being moved by the rotation of the actuator around the rotary shaft because of the first stepped side surface and the second stepped side surface which are formed at either side of the second plane of the ramp that is the shunt position of the actuator, and therefore, the tab of the actuator sub-unit will not move off from the second plane and the tab of the actuator sub-unit is held on the second plane of the ramp, and it is possible to prevent the actuator formed of the actuator sub-unit from moving to the recording medium side to bump against the recording medium, damaging the surface of the recording medium or causing serious damage to the component parts of the actuator. On the other hand, when the operation of the disk drive is started, the actuator sub-unit rotates about the line connecting the connecting portions of the two abutments of the pivot pedestal and the top surface of the actuator sub-unit, then a force is generated and acts to move the tab upward, and at the same time, a force is generated and acts to rotate the actuator about the rotary shaft, thereby moving the actuator off from the second plane that is the shunt position and loading it to move toward the surface of the recording medium, then the recording/reproducing operation of the disk drive is started. Accordingly, even when the disk drive is subjected to great external shocks when the disk drive is in stop mode, it is possible to realize a very reliable actuator gripping device having excellent shock resistance. Also, there is no need of separate members of special kind for gripping the actuator that is a signal conversion element oscillating arm, requiring no cost and space for special separate members for setting up the gripping mechanism, and it is possible to realize a gripping mechanism for a signal conversion element oscillating arm (actuator) which is inexpensive, small-sized, and may assure excellent shock resistance.

Also, since the disk drive comprises an actuator gripping device having such a configuration, it is possible to realize a highly reliable disk drive which is low-cost, small-sized, and may assure excellent shock resistance.

What is claimed is:

1. A disk drive, comprising:
  a recording medium rotatably supported for rotation around a spindle rotation axis;
  a head support arm including a read and/or write head and a tab mounted at one end of said head support arm, a first pivot bearing rotatably supporting said head support arm for rotation around a first rotation axis in a direction parallel to a recording surface of the recording medium, said first pivot bearing being located at a predetermined distance from the spindle rotation axis, a second pivot bearing rotatably supporting said head support arm for rotation around a second rotation axis in a direction perpendicular to the recording surface of said recording medium, the second rotation axis being disposed perpendicular to the first rotation axis;
  a spring plate arranged to resiliently bias said head support arm toward the recording surface of said recording medium, said spring plate connecting said head support arm and said second pivot bearing; and
  a ramp configured to retain said tab when said head support arm is at a parking position, said ramp comprising a first stepped side wall arranged to prevent the tab from moving from the parking position toward said recording medium and a maintaining plane arranged to maintain said tab at the parking position;
  wherein said head support arm and said ramp are arranged so that, in order to cause said tab to climb over said first stepped side wall and to cause said head support arm to rotatably move from the parking position to a read and/or write position on the recording medium, a driving force provided to said head support arm shall be provided in the direction perpendicular to the recording surface of the recording medium and in the direction parallel to the recording surface of the recording medium.

2. The disk drive according to claim 1,
  wherein a specified angle θ of said first stepped side wall with respect to said maintaining plane corresponding to the parking position of said head support arm is set in a range given by $$90° \leq \theta \leq 90° + \tan^{-1} \mu$$

where μ is a dynamic friction coefficient between said tab and said first stepped side wall when said tab slides in contact with said first stepped side wall.

3. The disk drive according to claim 2,
wherein the second rotation axis intersects the first rotation axis.

4. The disk drive according to claim 1,
wherein a specified angle θ of said first stepped side wall with respect to said maintaining plane corresponding to the parking position of said head support arm is set in a range given by $$90° \leq \theta \leq 100°.$$

5. The disk drive according to claim 4,
wherein the second rotation axis intersects the first rotation axis.

6. The disk drive according to claim 1,
wherein second pivot bearing includes a pair of abutments being arranged symmetrical to a centerline of said head support arm.

7. The disk drive according to claim 6,
wherein the second rotation axis intersects the first rotation axis.

8. The disk drive according to claim 1,
wherein the second rotation axis intersects the first rotation axis.

9. The disk drive according to claim 1,
wherein said head support arm has a substantially rigid body as compared with said spring plate.

10. The disk drive according to claim 1,
wherein said ramp is provided with a cover portion opposed to said maintaining plane.

11. The disk drive according to claim 1,
wherein a second stepped side wall is formed opposed to said first stepped side wall across said maintaining plane, said second stepped side wall having a specified angle with respect to said maintaining plane.

12. The disk drive according to claim 11,
wherein said second stepped side wall of said ramp is substantially perpendicular to said maintaining plane.

13. The disk drive according to claim 1, further comprising: a voice coil motor composed of a voice coil and a magnet and being operable to rotate said head support arm around the first rotation axis in a radial direction of said recording medium;
wherein a magnet portion opposed to said voice coil when said head support arm is at the parking position is larger in length in a radial direction of the rotation of said head support arm around the first rotation axis than a magnet portion opposed to said voice coil when said head support arm is at a read and/or write position on said recording medium during recording/reproducing operation.

14. The disk drive according to claim 13,
wherein a vertical driving force $F_4$ generated by said voice coil motor and acting on said tab in the direction perpendicular to said recording surface of the recording medium is set in a range given by $$F_4 > F_1 + \mu(F_1 \tan \alpha + F_3)$$

when said head support arm is rotatably moved toward said recording medium from the parking position of said head support arm;
wherein: $F_1$ is a biasing force provided by said spring plate acting on said tab to push said maintaining plane corresponding to the parking position of said head support arm,
$F_3$ is a horizontal driving force provided by said voice coil motor acting on said tab in a direction parallel to the recording surface of said recording medium;
μ is a dynamic friction coefficient between said tab and said first stepped side wall when said tab slides in contact with said first stepped side wall; and
α is an angle of said first stepped side wall with respect to a plane perpendicular to said maintaining plane.

15. The disk drive according to claim 13,
wherein said ramp is disposed in a vicinity of an outer periphery of said recording medium, and said magnet is disposed at an opposite side of said recording medium with respect to said head support arm provided with said voice coil.

16. The disk drive according to claim 13,
wherein said ramp is disposed in a vicinity of a rotation center of said recording medium, and said magnet is disposed at a same side of said recording medium with respect to said head support arm provided with said voice coil.

17. A disk drive, comprising:
a recording medium rotatably supported around a spindle rotation axis;
a head support arm including a read and/or write head and a tab mounted at one end of the head support arm, a first pivot bearing adapted to rotatably support the head support arm around a first rotation axis in a direction parallel to a recording surface of the recording medium, the first pivot bearing being located at a predetermined distance from the spindle rotation axis, a second pivot bearing adapted to rotatably support the head support arm around a second rotation axis in a direction perpendicular to the recording surface of the recording medium, the second rotation axis being disposed perpendicular to the first rotation axis of the first pivot bearing;
a spring plate adapted to resiliently bias the head support arm toward the recording surface of the recording medium, the spring plate adapted to connect the head support arm and the second pivot bearing; and
a ramp adapted to retain the tab when the head support arm is at a parking position, the ramp comprising a first stepped side wall adapted to prevent the tab from moving from the parking position toward the recording medium and a maintaining plane adapted to maintain the tab at the parking position;
wherein a driving force is provided to the head support arm in the direction perpendicular to the recording surface of the recording medium and in the direction parallel to the recording surface of the recording medium in order for the tab to climb over the first stepped side wall and rotatably move the head support arm from the parking position to a read and/or write position on the recording medium.

18. The disk drive according to claim 17,
wherein a specified angle θ of the first stepped side wall with respect to the maintaining plane corresponding to the parking position of the head support arm is set in the range given by $$90° \leq \theta \leq 90° + \tan^{-1} \mu$$

where μ is a dynamic friction coefficient between the tab and the first stepped side wall when the tab slides in contact with the first stepped side wall.

19. The disk drive according to claim 18,
wherein the specified angle θ of the first stepped side wall is set in the range given by $$90° \leq \theta \leq 100$$

with respect to the maintaining plane corresponding to the parking position of the head support arm.

20. The disk drive according to claim 17, wherein the second pivot bearing includes a pair of abutments being arranged symmetrical to a centerline of the head support arm.

21. The disk drive according to claim 17, wherein the second rotation axis of the second pivot bearing intersects the first rotation axis of the first pivot bearing.

22. The disk drive according to claim 17, wherein the head support arm has a substantially rigid body as compared with the spring plate.

23. The disk drive according to claim 17, wherein the ramp is provided with a cover portion opposed to the maintaining plane.

24. The disk drive according to claim 17, wherein a second stepped side wall is formed opposed to the first stepped side wall across the maintaining plane, the second stepped side wall having a specified angle with respect to the maintaining plane.

25. The disk drive according to claim 24, wherein the specified angle of the second stepped side wall of the ramp is substantially perpendicular to the maintaining plane.

26. The disk drive according to claim 17, further comprising: a voice coil motor composed of a voice coil and a magnet and being operable to rotate the head support arm around the first rotation axis of the first pivot bearing in the radial direction of the recording medium;
wherein a magnet portion opposed to the voice coil when the head support arm is at the parking position is larger in length in a radial direction of the rotation of the head support arm around the first rotation axis than a magnet portion opposed to the voice coil when the head support arm is at a read and/or write position on the recording medium during recording/reproducing operation.

27. The disk drive according to claim 26, wherein a vertical driving force $F_4$ generated by the voice coil motor and acting on the tab in the direction perpendicular to the recording surface of the recording medium is set in the range given by $$F_4 > F_1 + \mu(F_1 \tan \alpha + F_3)$$

when the head support arm is rotatably moved toward the recording medium from the parking position of the head support arm;
  wherein: $F_1$ is a biasing force provided by the spring plate acting on the tab to push the maintaining plane corresponding to the parking position of the head support arm;
  $F_3$ is a horizontal driving force provided by the voice coil motor acting on the tab in a direction parallel to the recording surface of the recording medium;
  $\mu$ is a dynamic friction coefficient between the tab and the first stepped side wall when the tab slides in contact with the first stepped side wall; and
  $\alpha$ is an angle of the first stepped side wall with respect to a plane perpendicular to the maintaining plane.

28. The disk drive according to claim 26, wherein the ramp is disposed in a vicinity of an outer periphery of the recording medium, and the magnet is disposed at an opposite side of the recording medium with respect to the head support arm provided with the voice coil.

29. The disk drive according to claim 26, wherein the ramp is disposed in a vicinity of the rotation center of the recording medium, and the magnet is disposed at a same side as the recording medium with respect to the head support arm provided with the voice coil.

* * * * *

UNITED STATES PATENT AND TRADEMARK OFFICE
CERTIFICATE OF CORRECTION

PATENT NO.        : 7,110,221 B2                                 Page 1 of 2
APPLICATION NO.   : 10/856943
DATED             : September 16, 2006
INVENTOR(S)       : Hideki Kuwajima et al.

It is certified that error appears in the above-identified patent and that said Letters Patent is hereby corrected as shown below:

On drawing sheet 2 of 13, Fig. 2 is replaced by Fig. 2 as represented below:
(see attached)

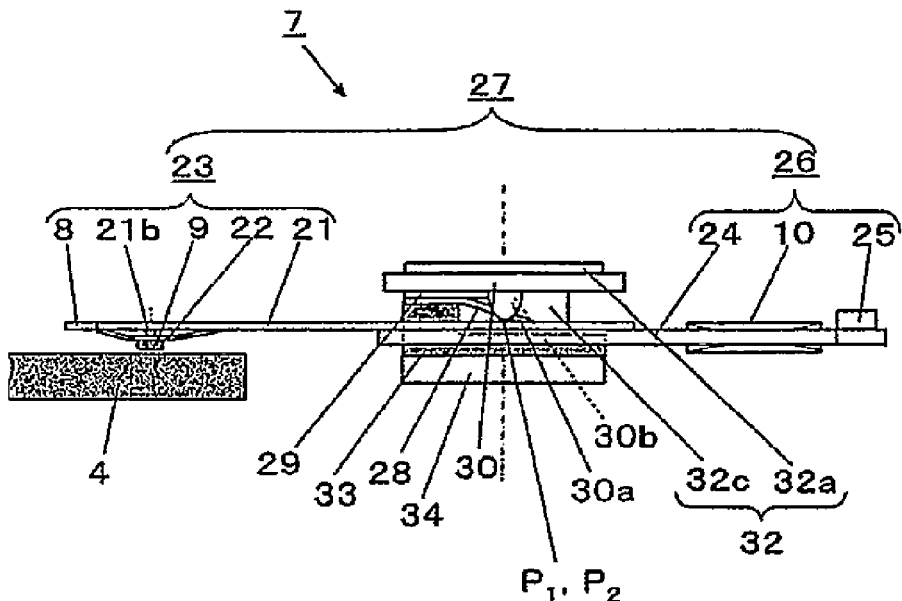

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,110,221 B2
APPLICATION NO. : 10/856943
DATED : September 19, 2006
INVENTOR(S) : Hideki Kuwajima et al.

It is certified that error appears in the above-identified patent and that said Letters Patent is hereby corrected as shown below:

On drawing sheet 2 of 13, Fig. 2 is replaced by Fig. 2 as represented below:
(see attached)

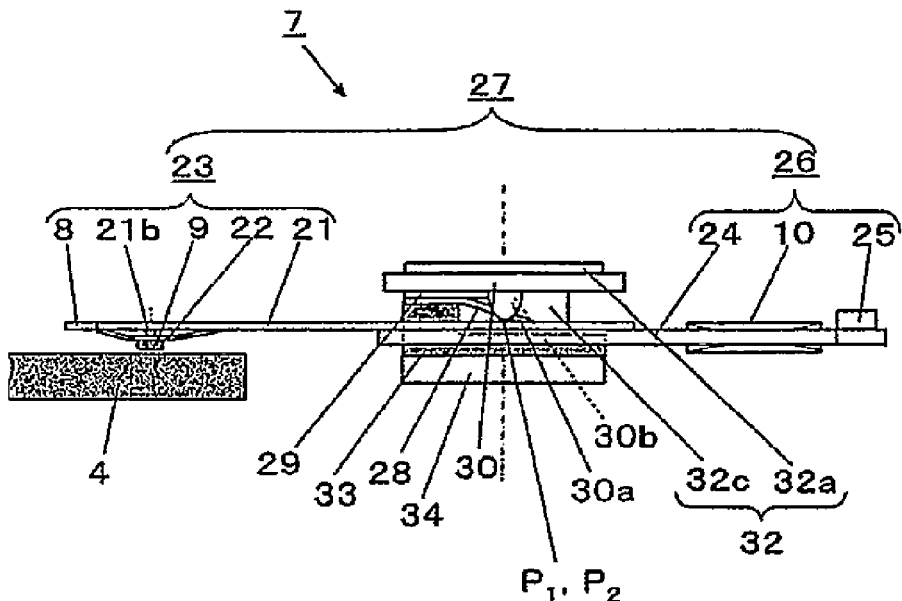

This certificate supersedes Certificate of Correction issued January 9, 2007.

Signed and Sealed this

Sixth Day of February, 2007

JON W. DUDAS
*Director of the United States Patent and Trademark Office*